United States Patent
Kitazawa et al.

(10) Patent No.: US 7,095,451 B2
(45) Date of Patent: Aug. 22, 2006

(54) IMAGE PROCESSING SYSTEM, PROJECTOR, INFORMATION STORAGE MEDIUM AND BLACK AND WHITE EXTENSION PROCESSING METHOD

(75) Inventors: Takayuki Kitazawa, Suwa (JP); Masato Nishizawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 596 days.

(21) Appl. No.: 10/396,337

(22) Filed: Mar. 26, 2003

(65) Prior Publication Data
US 2003/0214607 A1    Nov. 20, 2003

Related U.S. Application Data

(63) Continuation of application No. PCT/JP02/07593, filed on Jul. 26, 2002.

(30) Foreign Application Priority Data

Jul. 26, 2001    (JP)    ............... 2001-226333
Jun. 6, 2002    (JP)    ............... 2002-165677

(51) Int. Cl.
H04N 5/52    (2006.01)
H04N 9/72    (2006.01)

(52) U.S. Cl. .................. 348/679; 348/692; 348/712; 348/690

(58) Field of Classification Search ............ 348/678, 348/679, 687, 692, 712, 713, 708, 673, 690, 348/671; H04N 5/52, 5/57, 9/72, 9/64, 5/14
See application file for complete search history.

(56) References Cited

U.S. PATENT DOCUMENTS

| | | | |
|---|---|---|---|
| 5,210,610 A | | 5/1993 | Kanashiki et al. |
| 5,619,280 A | * | 4/1997 | Yamashita et al. .......... 348/645 |
| 6,351,558 B1 | | 2/2002 | Kuwata |

FOREIGN PATENT DOCUMENTS

| | | |
|---|---|---|
| JP | A 4-349783 | 12/1992 |
| JP | A 8-331504 | 12/1996 |
| JP | A 10-198802 | 7/1998 |
| JP | A 2001-27890 | 1/2001 |
| JP | A 2001-125535 | 5/2001 |
| JP | A 2001-134226 | 5/2001 |
| JP | A 2001-343957 | 12/2001 |
| JP | A 2002-41007 | 2/2002 |

* cited by examiner

Primary Examiner—Sherrie Hsia
(74) Attorney, Agent, or Firm—Oliff & Berridge, PLC

(57) ABSTRACT

To provide an image processing system, projector, information storage medium and black and white extension processing method which can improve the quality of image when at least one of white extension and black extension is performed to video signals, a extension degree setting section is controlled by using a control section to change a degree of extension only when a change-over of scenes occurs, and luminance values of R-signals, G-signals and B-signals are extended toward one of white and black sides with the degree of extension set by the extension degree setting section by using extending sections and a luminance changing section.

26 Claims, 16 Drawing Sheets

IMAGE PROCESSING SYSTEM, PROJECTOR, INFORMATION STORAGE MEDIUM AND BLACK AND WHITE EXTENSION PROCESSING METHOD

This is a Continuation of International Application No. PCT/JP02/07593 filed Jul. 26, 2002. The entire disclosure of the prior application is hereby incorporated by reference herein in its entirety.

Japanese Patent Application No. 2001-226333 filed on Jul. 26, 2001, Japanese Patent Application No. 2002-165677 filed on Jun. 6, 2002, and International Application No. PCT/JP02/007593 filed on Jul. 26, 2002 are hereby incorporated by reference in their entirety.

BACKGROUND OF THE INVENTION

The present invention relates to an image processing system, projector, information storage medium and black and white extension processing method, in which at least one of white and black extensions is performed for video signal.

If the blackest portion of an input video signal is higher than a predetermined level, the blackest portion has been extended to the predetermined level in a direction of black. If the whitest portion of an input video signal is lower than a predetermined level, the whitest portion has been extended to the predetermined level in a direction of white.

In the prior art, such a degree of extension was always variable depending on the maximum and minimum luminance values in one image (or frame).

However, the entire image might flicker, for example, if a moving image such as video image was processed through a system of always varying the degree of extension.

BRIEF SUMMARY OF THE INVENTION

In view of the aforementioned problem, an object of the present invention may provide an image processing system, projector, information storage medium and black and white extension processing method, in which the quality of image can be improved when at least one of black extension and white extension (or black and white extension) is carried out for a video signal and particularly in which the flickering of an image produced when the image is subjected to the black and white extension processing can be reduced.

(1) According to the present invention, there is provided an image processing system comprising:

extension degree setting means for setting a degree of extension of luminance values of pixels in one frame based on the maximum and minimum luminance values of the pixels; and extension means for extending luminance values of pixels to be subjected to processing among the pixels in the frame toward one of black and white sides based on the degree of extension when the luminance values are equal to or higher than a predetermined threshold value, and extending the luminance values toward one of white and black sides based on the degree of extension when the luminance values are lower than the predetermined threshold value.

(2) According to the present invention, there is also provided an image processing system comprising:

a extension degree setting section which sets a degree of extension of luminance values of pixels in one frame based on the maximum and minimum luminance values of the pixels; and an extension section which extends luminance values of pixels to be subjected to processing among the pixels in the frame toward one of black and white sides based on the degree of extension when the luminance values are equal to or higher than a predetermined threshold value, and extending the luminance values toward one of white and black sides based on the degree of extension when the luminance values are lower than the predetermined threshold value.

(3) According to the present invention, there is provided a projector comprising:

extension degree setting means for setting a degree of extension of luminance values of pixels in one frame based on the maximum and minimum luminance values of the pixels; and extension means for extending luminance values of pixels to be subjected to processing among the pixels in the frame toward one of black and white sides based on the degree of extension when the luminance values are equal to or higher than a predetermined threshold value, and extending the luminance values toward one of white and black sides based on the degree of extension when the luminance values are lower than the predetermined threshold value.

(4) According to the present invention, there is also provided a projector comprising:

a extension degree setting section which sets a degree of extension of luminance values of pixels in one frame based on the maximum and minimum luminance values of the pixels; and an extension section which extends luminance values of pixels to be subjected to processing among the pixels in the frame toward one of black and white sides based on the degree of extension when the luminance values are equal to or higher than a predetermined threshold value, and extending the luminance values toward one of white and black sides based on the degree of extension when the luminance values are lower than the predetermined threshold value.

(5) According to the present invention, there is provided a computer-readable information storage medium storing a program for causing a computer to function as:

extension degree setting means for setting a degree of extension of luminance values of pixels in one frame based on the maximum and minimum luminance values of the pixels; and extension means for extending luminance values of pixels to be subjected to processing among the pixels in the frame toward one of black and white sides based on the degree of extension when the luminance values are equal to or higher than a predetermined threshold value, and extending the luminance values toward one of white and black sides based on the degree of extension when the luminance values are lower than the predetermined threshold value.

(6) According to the present invention, there is provided a black and white extension processing method of performing a black and white extension of luminance values of video signals, comprising the steps of:

computing the luminance values of inputted video signals;

grasping the maximum and minimum values among the luminance values in one frame;

computing a predetermined threshold value, based on the grasped maximum and minimum luminance values; and extending luminance values equal to or higher than the threshold value toward one of black and white sides and extending luminance values lower than the threshold value toward one of white and black sides.

Thus, the image processing system and the like determines the direction of extension relating to the threshold value based on the maximum and minimum luminance values, thereby a distinct criterion for determining the direction of extension toward either white or black can be provided.

Therefore, the quality of image can be improved since an appropriate black and white extension is made by the black and white extension being performed by the image processing system and the like using this criterion.

In the case of the luminance value being equal to or higher than the aforementioned threshold value, the extension of the luminance value toward either black or white is preferably determined depending on the mode of display in the image processing system and the like.

(7) The image processing system and the projector may comprise control means for generating information of request for causing the extension degree setting means to update the degree of extension, based on the maximum and minimum luminance values of the pixels in one frame, wherein the extension degree setting means may use a new degree of extension in the case where the information of request has been received, and may use the original degree of extension in the case where the information of request has not been received.

(8) The information storage medium may store a program for causing a computer to function as:

control means for generating information of request for causing the extension degree setting means to update the degree of extension, based on the maximum and minimum luminance values of the pixels in one frame, wherein the extension degree setting means may use a new degree of extension in the case where the information of request has been received, and may use the original degree of extension in the case where the information of request has not been received.

(9) In the image processing system, the projector and the information storage medium, the control means may grasp changes of the luminance values in a plurality of successive frames and may transmit the information of request to the extension degree setting means when the changes are equal to or larger than a predetermined value.

(10) In the black and white extension processing method, when performing the extension, the luminance values may be extended by using a new rate of extension in the case where the changes of the luminance values in a plurality of successive frames are equal to or larger than a predetermined value and using the current rate of extension in the case where the changes are smaller than the predetermined value.

Thus, the image processing system and the like can detect any change-over of scenes in a video by detecting the case in which the changes of the luminance values between a plurality of successive frames are equal to or larger than the predetermined value.

Moreover, the image processing system and the like can suppress the flickering of an image and improve the quality of an image by performing the black and white extension using a new rate of extension only when such a change-over of scenes is made.

(11) In the image processing system, the projector and the information storage medium, the extension degree setting means may set a rate of extension of luminance values close to the maximum and minimum luminance values at a value smaller than a rate of extension of luminance values close to the middle luminance value.

(12) In the black and white extension processing method, when performing the extension of the luminance values, a rate of extension of luminance values close to the maximum and minimum luminance values may be set at a value smaller than a rate of extension of luminance values close to the middle luminance value.

Thus, the image processing system and the like can effectively perform the black and white extension by suppressing the extension at regions close to the maximum and minimum luminance values in which the extension is less effective and more extending the middle gray scale, or input signal value.

(13) The image processing system and the projector may further comprise control means for generating information of request for causing the extension degree setting means to update the degree of extension when a difference in APL between two different frames is equal to or larger than a predetermined value, wherein the extension degree setting means may use a new degree of extension in the case where the information of request has been received, and may use the original degree of extension in the case where the information of request has not been received.

(14) The information storage medium may store a program for causing a computer to function as control means for generating information of request for causing the extension degree setting means to update the degree of extension when a difference in APL between two different frames is equal to or larger than a predetermined value, wherein the extension degree setting means may use a new degree of extension in the case where the information of request has been received, and may use the original degree of extension in the case where the information of request has not been received.

(15) In the black and white extension processing method, the extension of the luminance values may be performed using a new rate of extension when a difference of APL between two different frames is equal to or larger than a predetermined value and using the current rate of extension when the difference is smaller than the predetermined value.

(16) The image processing system and the projector may further comprise control means for generating information of request for causing the extension degree setting means to update the degree of extension when a difference between an average value of APL per one frame of a plurality of frames subsequent to a predetermined frame and an average value of APL per one frame of a plurality of frames subsequent to a frame different from the predetermined frame is equal to or larger than a predetermined value, wherein the extension degree setting means may use a new degree of extension in the case where the information of request has been received, and may use the original degree of extension in the case where the information of request has not been received.

(17) The information storage medium may store a program for causing a computer to function as control means for generating information of request for causing the extension degree setting means to update the degree of extension when a difference between an average value of APL per one frame of a plurality of frames subsequent to a predetermined frame and an average value of APL per one frame of a plurality of frames subsequent to a frame different from the predetermined frame is equal to or larger than a predetermined value, wherein the extension degree setting means may use a new degree of extension in the case where the information of request has been received, and may use the original degree of extension in the case where the information of request has not been received.

(18) In the black and white extension processing method, the extension of the luminance values may be performed using a new rate of extension when a difference between an average value of APL per one frame of a plurality of frames subsequent to a predetermined frame and an average value of APL per one frame of a plurality of frames subsequent to a frame different from the predetermined frame is equal to or larger than a predetermined value, and using the current rate of extension when the difference is smaller than the predetermined value.

Thus, the image processing system and the like may determine the change-over of scenes according to the change of luminance values in the entire image using APL (average picture level: average luminance level of an image). In such a manner, the image processing system and the like can perform the extension using a new degree of extension in the case where the change of the luminance values in the entire image is large.

Additionally, the image processing system and the like can suppress any abrupt change of luminance due to the change of APL based on the difference of the average value of APL per one frame in a plurality of successive frames.

The aforementioned two different frames may be two successive frames or two frames with at least one frame interposed therebetween.

(19) In the image processing system, the projector and the information storage medium, the extension degree setting means may set a rate of extension of luminance values close to the maximum and minimum luminance values at a value smaller than a rate of extension of a luminance value close to the middle luminance value.

(20) Moreover, in the black and white extension processing method, a rate of extension of luminance values close to the maximum and minimum luminance values may be set at a value smaller than a rate of extension of luminance values close to the middle luminance value.

In such a manner, the image processing system and the like can reduce deteriorated tone-mappings of highlight and shadow details by the extension in regions close to white and black, and more effectively perform the extension by more extending the middle gray scale in which the extension is more effective.

(21) In the image processing system, the projector and the information storage medium, in a luminance value-change-characteristic line representing the relationship between the luminance values of pre-extension and post-extension, the extension means may extend the luminance values so that, outside a range showing the luminance values subjected to the extension, the luminance value-change-characteristic line on the side of lower luminance values is a straight line connecting an origin and a bottom point of a line representing change-characteristic of the luminance values subjected to the extension, and the luminance value-change-characteristic line on the side of higher luminance values is a straight line connecting the maximum point and a top point of the line representing change-characteristic of the luminance values subjected to the extension.

(22) Moreover, in the black and white extension processing method, in a luminance value-change-characteristic line representing the relationship between the luminance values of pre-extension and post-extension, the extension of the luminance values may be performed so that, outside a range showing the luminance values subjected to the extension, the luminance value-change-characteristic line on the side of lower luminance values is a straight line connecting an origin and a bottom point of a line representing change-characteristic of the luminance values subjected to the extension, and the luminance value-change-characteristic line on the side of higher luminance values is a straight line connecting the maximum point and a top point of the line representing change-characteristic of the luminance values subjected to the extension.

In such a manner, the image processing system and the like can appropriately perform the extension since the information of luminance relating to a portion in which the luminance out of the range of extension is compressed is maintained as much as possible, the information appearing when the range of luminance value is partially extended.

(23) In the image processing system, the projector and the information storage medium, video signals may include R-signals, G-signals and B-signals, and the extension degree setting means may use values obtained by dividing the sum of signal values of the R-signals, G-signals and B-signals by three as the luminance values.

(24) In the black and white extension processing method, the video signals may include R-signals, G-signals and B-signals, and the luminance values may be obtained by dividing the sum of signal values of the R-signals, G-signals and B-signals by three.

Thus, the image processing system and the like can prevent an image from becoming greenish and improve the quality of an image by using the values obtained by evenly dividing the signal values of the signals as the luminance values.

BRIEF DESCRIPTION OF THE SEVERAL VIEWS OF THE DRAWING

FIG. 13(A) is a diagrammatic view illustrating a luminance value-change-characteristic line in a first example of the embodiment, while

DETAILED DESCRIPTION OF THE EMBODIMENT

Figure 1:
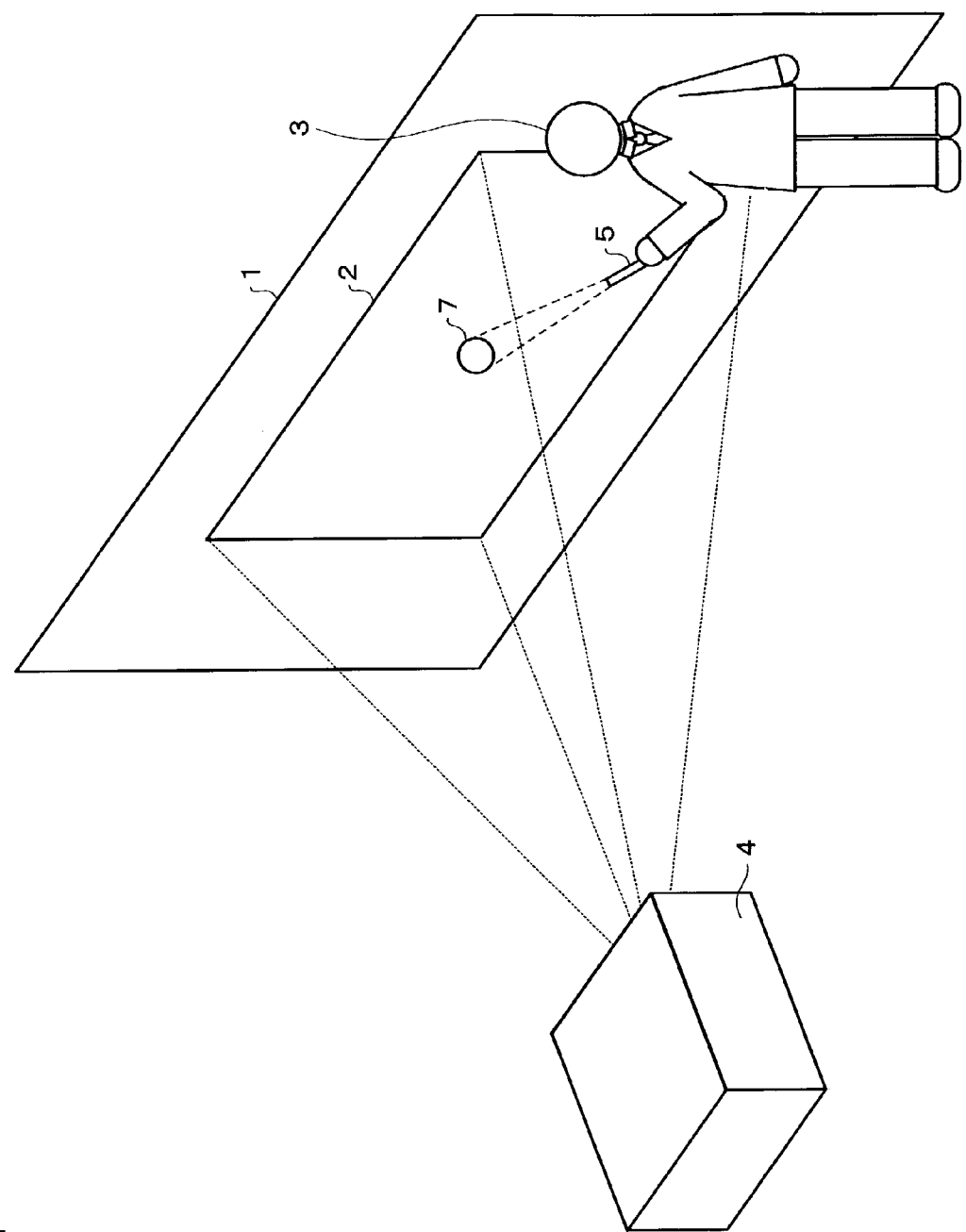
FIG. 1 is a schematic illustration of a projector according to one example of an embodiment of the present invention.

The present invention will now be described in connection with an image processing circuit for performing the black and white extension relating to input R-, G- and B-signals which are a kind of video signals, to which the present invention is applied and which is illustrated in the drawings. By the way, an embodiment shown in the following is not intended to limit the subject matter of the invention as described in the accompanying claims. All the components shown in such an embodiment is not necessarily essential for carrying out the invention defined by the accompanying claims.

Entire System

The present invention will be described in connection with a black and white extension circuit in a liquid crystal projector to which the present invention is applied.

FIG. 1 is a schematic illustration of a projector according to one example of an embodiment of the present invention.

A projector 4 is located substantially in the front of a screen 1 and projects calibration and presentation images.

A presenter 3 performs a presentation to the third person(s) while pointing a desired location on an image in an image display region 2 which is a display region on the screen 1, using a spot light 7 projected from a laser pointer 5.

When such a presentation images or the like is to be projected, the projector 4 can project a lively image if the black and white extension is carried out.

Functional blocks of an image processing system in the projector 4 will now be explained.

Figure 2:
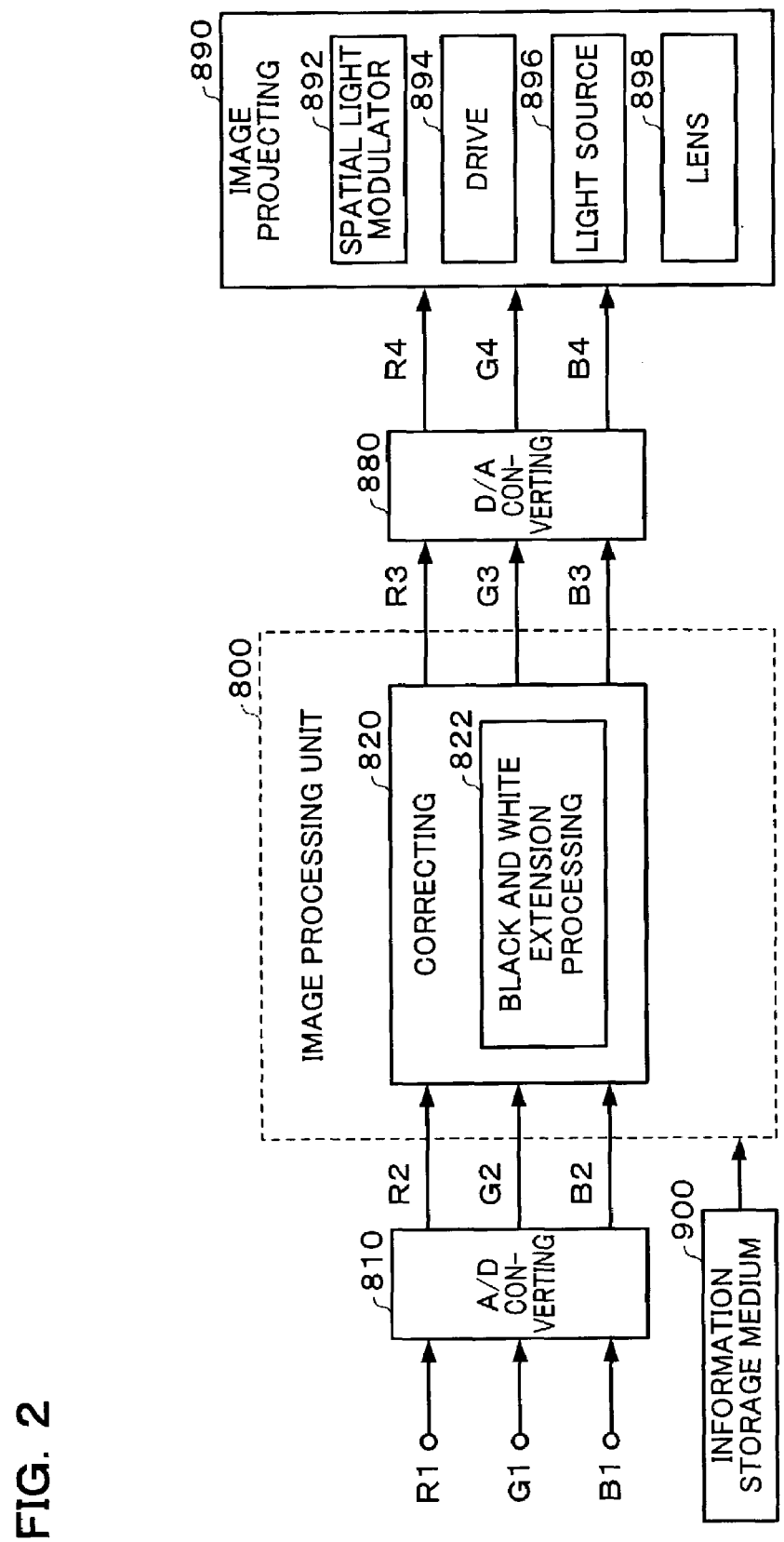
FIG. 2 is a functional block diagram of an image processing section in a projector according to the one example of the embodiment of the present invention.

FIG. 2 is a functional block diagram of an image processing section in a projector according to the one example of the embodiment of the present invention.

The image processing system in the projector 4 comprises an A/D converting section 810, an image processing section 800, a D/A converting section 880 and an image projecting section 890.

However, the A/D converting section 810 and D/A converting section 880 are unnecessary if only digital type R-, G- and B-signals are used in the image processing system.

The A/D converting section 810 converts R1-, G1- and B1-signals constituting analog R-, G- and B-signals which are a kind of input image information from PC (Personal Computer) or the like into digital R2-, G2- and B2-signals.

The image processing section 800 comprises a correcting section 820 for correcting image information (R2-, G2- and B2-signals) using a predetermined image compensation data and then outputting the corrected image information (R3-, G3- and B3-signals).

The correcting section 820 includes a black and white extension processing section 822.

The D/A converting section 880 converts the R3-, G3- and B3-signals subjected to the black and white extension or the like at the correcting section 820 into analog R4-, G4- and B4-signals.

The image projecting section 890 comprises a spatial light modulator 892, a drive section 894 for driving the spatial light modulator 892 based on the R4-, G4- and B4-signals from the D/A converting section 880, a light source 896 for outputting a light toward the spatial light modulator 892 and a lens 898 for projecting the light after it has been modulated at the spatial light modulator 892.

The image projecting section 890 projects an image based on the R4-, G4- and B4-signals.

In such a manner, the projector 4 will project the image after it has been subjected to the black and white extension.

The hardware configuration in the projector 4 will now be explained.

Figure 16:
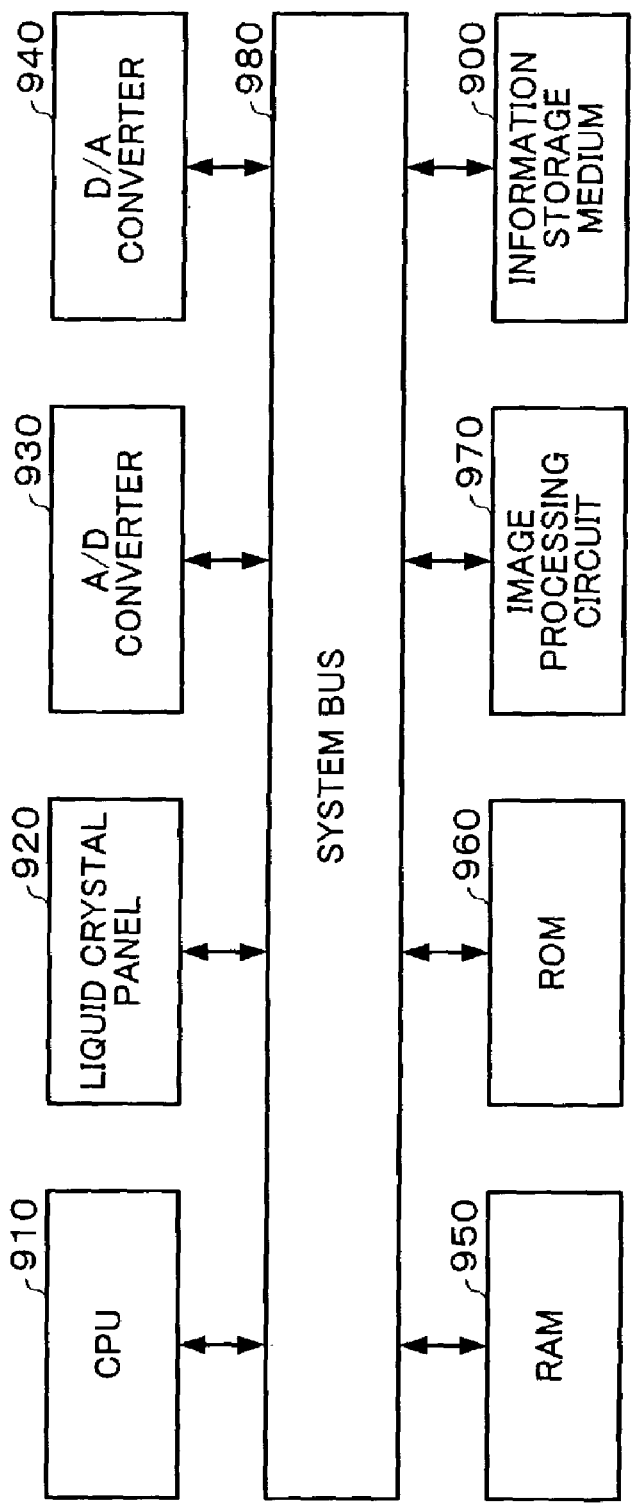
FIG. 16 is a hardware block diagram illustrating an image processing section in a projector according to the one example of the embodiment of the present invention.

FIG. 16 is a hardware block diagram illustrating a projector 4 according to the one embodiment of the present invention.

For example, the A/D converting section 810 may be realized by an A/D converter 930 or the like; the image processing section 800 by an image processing circuit 970, RAM 950, CPU 910 or the like; the D/A converting section 880 by a D/A converter 940 or the like; and the spatial light modulator 892 by a liquid crystal panel 920, ROM 960 stored a liquid crystal light valve driver for driving the liquid crystal panel 920 or the like. By the way, these sections are configured to mutually deliver the information therebetween through a system bus 980. Additionally, these sections may be realized in a hardware manner or in a software manner such as drivers.

Furthermore, a program may be read out from an information storage medium 900 for causing a computer to realize the function of the black and white extension processing section 822.

Such an information storage medium 900 may be accomplished, for example, by CD-ROM, DVD-ROM, ROM, RAM, HDD or the like through either of the contact or non-contact type reading mode.

Rather than the information storage medium 900, furthermore, the aforementioned functions can be realized by downloading a program or the like for realizing them from a host device or the like through a transmission channel.

Two examples (first and second examples) the embodiment of the black and white extension circuit included in the black and white extension processing section 822 will sequentially be explained.

First Example of the Embodiment

Figure 3:
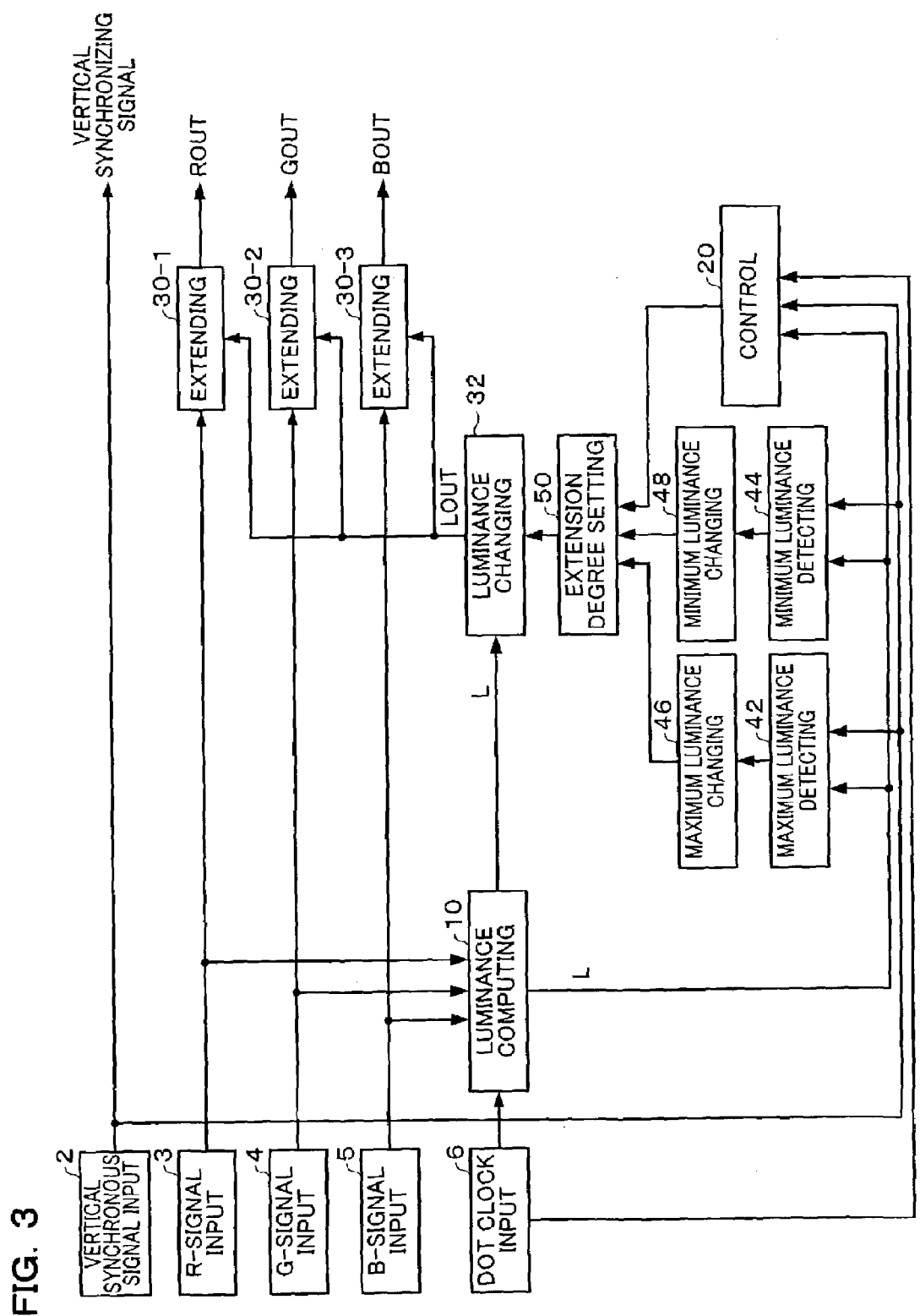
FIG. 3 is a functional block diagram of a black and white extension circuit according to the one example of the embodiment of the present invention.

FIG. 3 is a functional block diagram of a black and white extension circuit according to the one example of the embodiment.

A black and white extension circuit of this embodiment comprises a luminance computing section 10 for determining a reference luminance value based on the luminance values of the respective R-, G- and B-signals, a maximum luminance detecting section 42 functioning as a extension degree setting means for setting the rate of extension (or degree of extension) of the luminance values of the respective R-, G- and B-signals, based on the determined luminance value, a maximum luminance changing section 46, a minimum luminance detecting element 44, a minimum luminance value changing section 48 and a extension degree setting section 50.

The black and white extension circuit of this embodiment further comprises a control section 20 for controlling the extension degree setting section 50, a luminance changing section 32 for determining the extension toward either of black or white based on the extension degree set by the extension degree setting section 50, and extending sections 30-1 to 30-3 for extending the luminance values of the respective R-, G- and B-signals. By the way, each of the luminance changing and extending sections (32, 30-1 to 30-3) is a kind of extension means.

The luminance computing section 10 receives the signal values of R-, G- and B-signals from the respective R-, G- and B-signal input sections 3, 4, 5 to compute the reference luminance value, at a timing based on dot clock signals from a dot clock input section 6.

Figure 4:
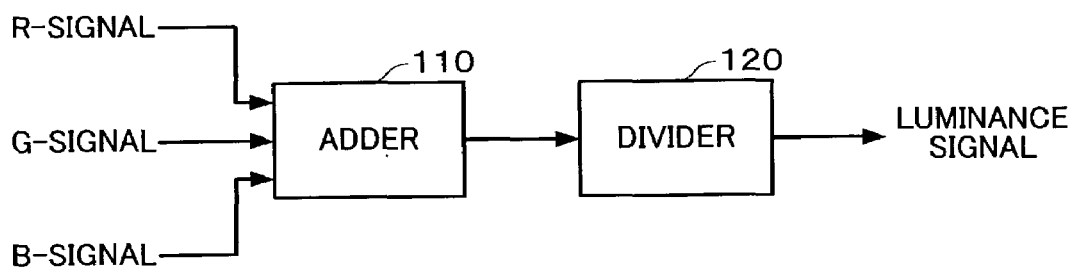
FIG. 4 is a circuit diagram of a luminance computing section according to the one example of the embodiment of the present invention.

FIG. 4 is a circuit diagram of a luminance computing section 10 according to the one example of the embodiment of the present invention.

The luminance computing section 10 includes an adder 110 and a divider 120.

The adder 110 computes the sum of the signal values of the R-, G- and B-signals while the divider 120 outputs a reference luminance value obtained by dividing the sum determined at the adder 110 by three (3).

In the general scheme, the reference luminance value is determined as 0.30*R-signal value+0.59*G-signal value+0.11*B-signal value. Such different weighted values are caused by different sensitivities in human's eyes.

When the luminance is to be determined through the aforementioned formula in the black and white extension, however, a portion containing a higher G-luminance component may more conspicuously be extended.

To avoid such a problem, this embodiment determines the reference luminance value as (R-signal value+G-signal value+B-signal value)/3.

The maximum luminance changing section 46 determines how much the maximum luminance value detected at the maximum luminance detecting section 42 is to be extended. Moreover, the minimum luminance changing section 48 determines how much the minimum luminance value detected at the minimum luminance detecting section 44 is to be extended.

In this embodiment, the gray scales, or input signal values of luminance values close to the maximum and minimum luminance values is less extended than that of the middle gray scale. This is because the color will solidly be shaded by extension of the maximum luminance value at a region in which the luminance value is close to zero, that is, to black. Similarly, the color will solidly be shaded by extension of the maximum luminance value at a region in which the luminance value is close to 255, that is, to white.

Even when the rate of extension is lowered at the region close to the maximum or minimum luminance value, the black and white extension processing section 822 can effectively perform the black and white extension by more extending the middle gray scale since changes of the gray scale in the regions close to the maximum and minimum luminance values is less clearly recognized.

The reference luminance value thus determined by the luminance computing section 10 is then inputted into the maximum luminance detecting section 42, minimum luminance detecting element 44 and control section 20.

The maximum luminance detecting section 42 detects the maximum luminance value per one frame, based on the reference luminance value fed from the luminance computing section 10. Similarly, the minimum luminance detecting section 44 detects the minimum luminance value per one frame, based on the reference luminance value fed from the luminance computing section 10. By the way, the maximum and minimum luminance detecting sections 42, 44 determine the timing of frame change-over, based on a vertical synchronizing signal from a vertical synchronizing signal input section 2.

The control section 20 computes a predetermined unit of luminance value, that is, the number of pixels distributed for a predetermined gray scale. A matter showing the distribution of the number of pixels for each gray scale is referred to as histogram.

The control section 20 also detects the changes of histogram between frames, that is, the changes of distribution for the number of pixels for each gray scale.

The control section 20 further outputs information of request for extension degree updating toward the extension degree setting section 50 such that the degree of black and white extension will be updated only when the above changes exceed a threshold level.

The circuitry of the control section 20 will now be explained.

Figure 5:
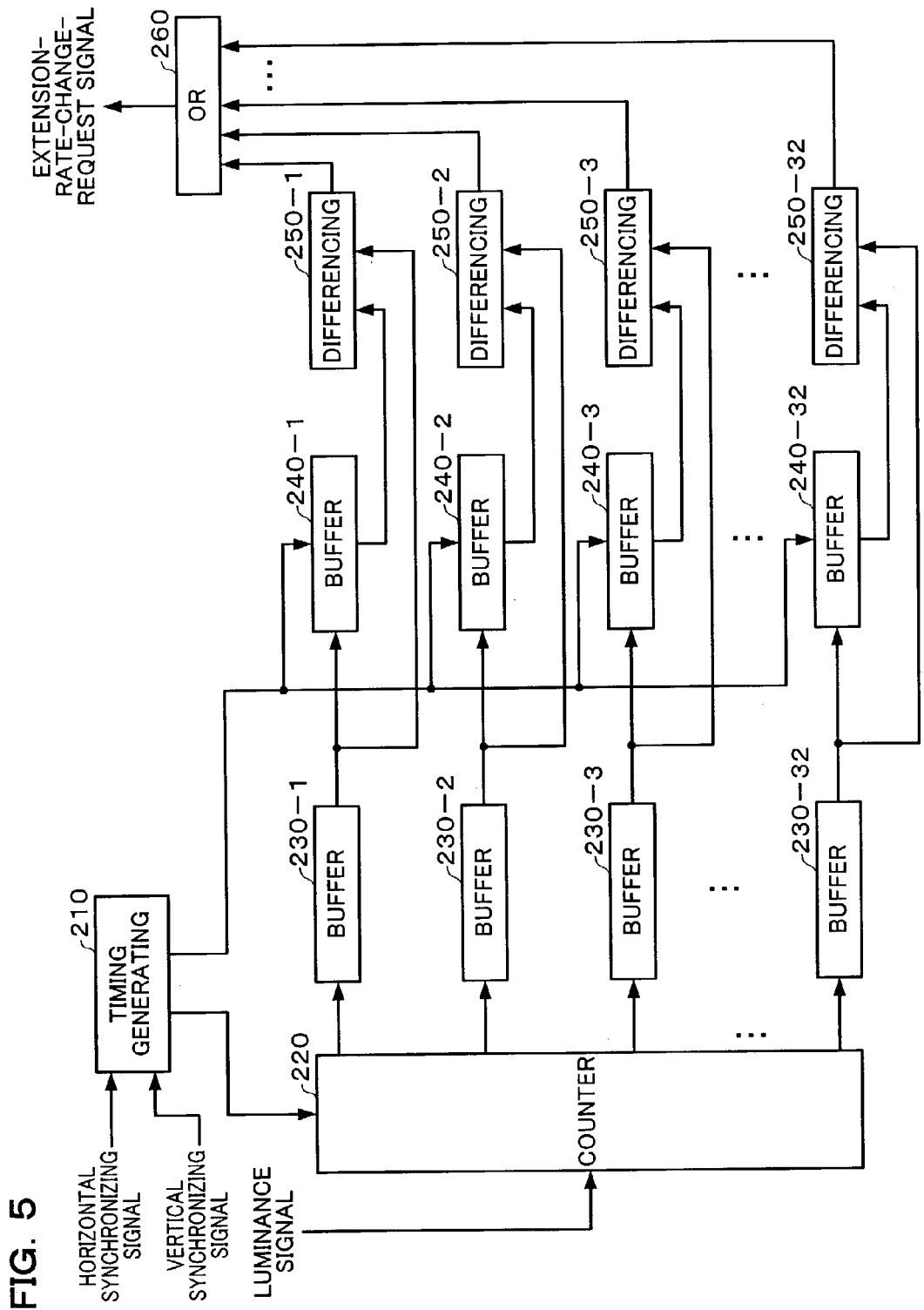
FIG. 5 is a circuit diagram of a control section according to the one example of the embodiment of the present invention.

FIG. 5 is a circuit diagram of a control section 20 according to the one example of the embodiment of the present invention.

The control section 20 comprises a timing generation circuit 210, a counter circuit 220, buffers 230-1 to 230-32, buffers 240-1 to 240-32, differencing circuits 250-1 to 250-32 and an OR circuit 260.

In this embodiment, the control section 20 also comprises buffers 240-1 to 240-32 for performing the process with 32 gray scales.

The counter circuit 220 determines a gray scale to which a pixel belongs, based on a luminance signal indicative of the reference luminance value computed by the luminance computing section 10 and increments a count corresponding to the determined gray scale. The counter circuit 220 then gives a count to the respective one of the buffers 230-1 to 230-32 and also initializes all of 32 counts in the counter circuit 220 into zero, when the luminance signals corresponding to one frame have been processed.

Each of the buffers 230-1 to 230-32 transfers its received count to the corresponding one of the buffers 240-1 to 240-32 and also transfers it to the corresponding one of the differencing circuits 250-1 to 250-32.

Each of the buffers 240-1 to 240-32 hold its received count by the period of one frame and then transfers it to the corresponding one of the differencing circuits 250-1 to 250-32.

Each of the differencing circuits 250-1 to 250-32 computes a difference between the number of pixels in the n-th frame transferred from the corresponding one of the buffers 240-1 to 240-32 and the number of pixels in the n+1-th frame transferred from the corresponding one of the buffers 240-1 to 240-32. Thus, an absolute value of the difference of the number of pixels having the same gray scale values between the frames can be obtained.

Each of the differencing circuits 250-1 to 250-32 further outputs HIGH signal toward the OR circuit 260 if it detects a difference exceeding the aforementioned threshold value and LOW signal toward the OR circuit 26 if not so.

The OR circuit 260 outputs HIGH signal as a extension-rate-change-request signal indicative of information of request for extension degree updating if at least one HIGH signal exists in 32 signals fed from the differencing circuits 250-1 to 250-32 and LOW signal if not so.

In this embodiment, the case when the absolute value of the difference of the number of pixels having the same gray scale values between the frames exceeds the threshold value is determined as a change-over timing, and performs the image processing such that the degree of extension will be changed at the extending section 30 only on change-over of scene.

Figure 6:
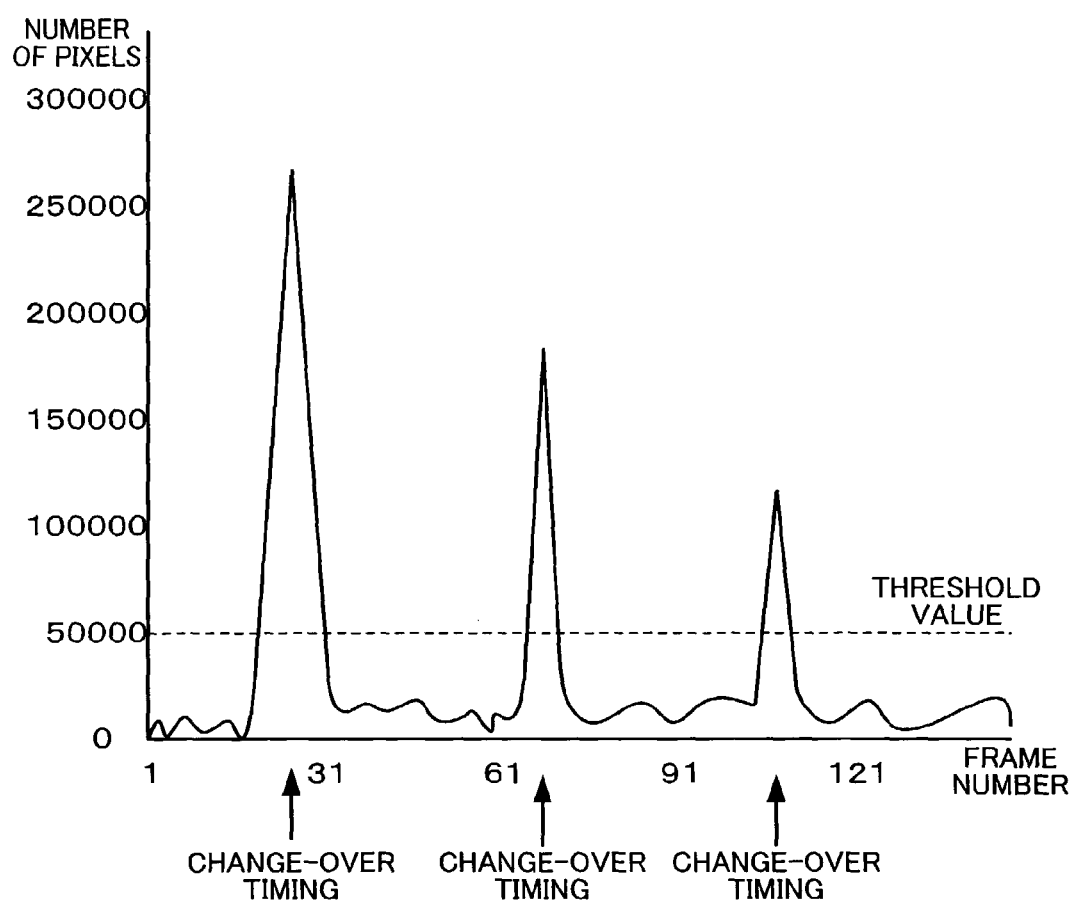
FIG. 6 is a diagrammatic view illustrating a scene changing-over timing according to the one example of the embodiment of the present invention.

FIG. 6 is a diagrammatic view illustrating a scene changing-over timing according to the one example of the embodiment of the present invention.

As shown in FIG. 6, a frame exceeding a threshold value consisted of a predetermined number of pixels is detected as scene change-over timing.

Furthermore, this embodiment performs the black and white extension only when the scene change-over is detected in such a manner.

As a result, the flickering in the entire image can be prevented.

The extension degree setting section 50 receives a maximum post-extension luminance value signal indicative of the maximum luminance value converted at the maximum luminance changing section 46, a maximum pre-extension luminance value signal indicative of the maximum luminance value before converted, a minimum post-extension luminance value signal indicative of the minimum luminance value converted at the minimum luminance value converter 48, a minimum pre-extension luminance value signal indicative of the minimum luminance value before converted and a extension-rate-change-request signal from the control section 20.

The circuitry of the extension degree setting section 50 will be described below.

Figure 7:
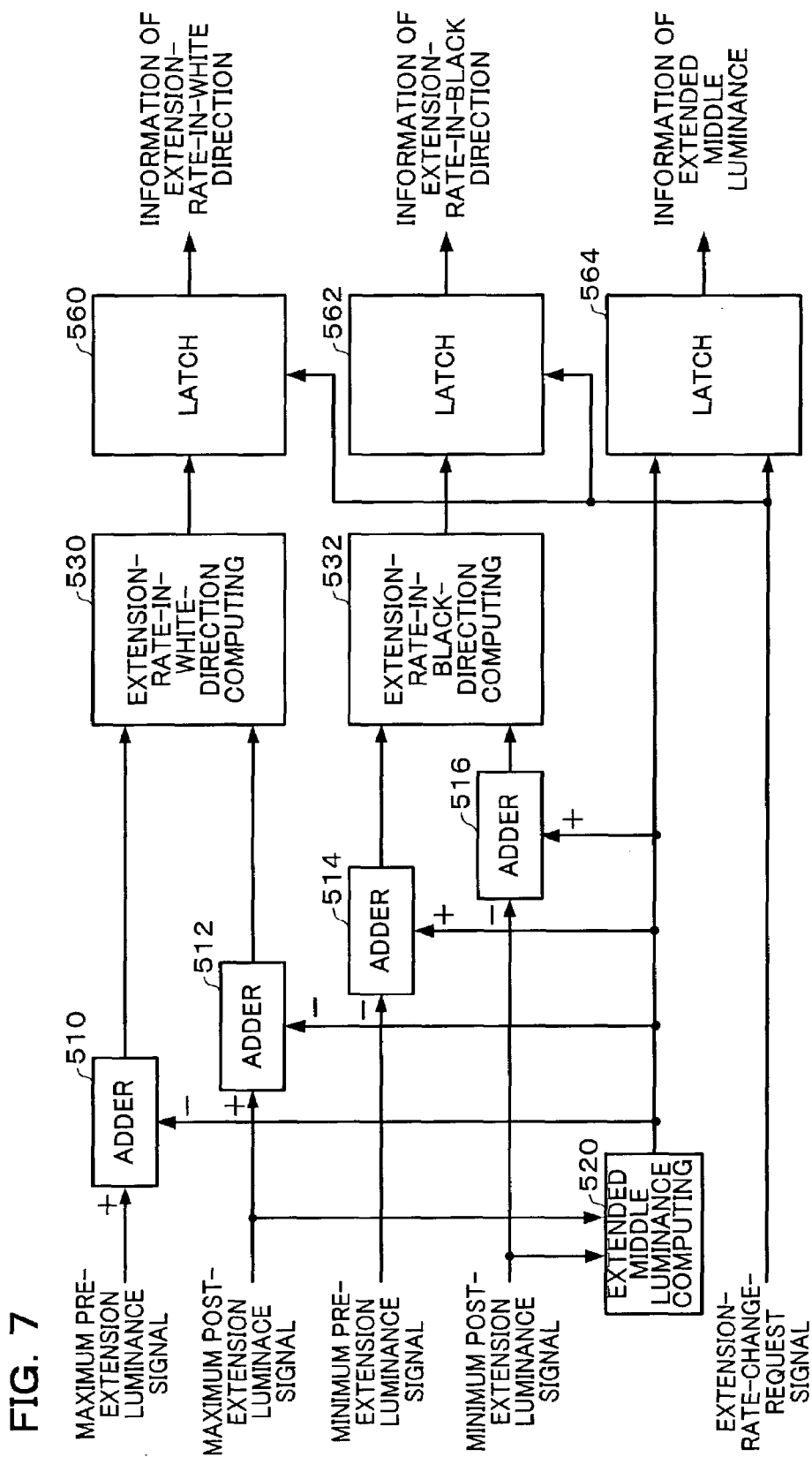
FIG. 7 is a circuit diagram of an extension degree setting section according to the one example of the embodiment of the present invention.

FIG. 7 is a circuit diagram of the extension degree setting section 50 according to the one example of the embodiment of the present invention.

The extension degree setting section 50 comprises a extended middle luminance computing section 520, an extension-rate-in-white-direction computing section 530, an extension-rate-in-black-direction computing section 532, four adders 510 to 516 and three latch sections 560 to 564.

The extension degree setting section 50 also receives the maximum pre-extension and post-extension luminance value signals from the maximum luminance changing section 46, the minimum pre-extension and post-extension luminance value signals from the minimum luminance value changing section 48 and the extension-rate-change-request signal from the control section 20.

The extended middle luminance computing section 520 receives the maximum post-extension luminance value signal and minimum post-extension luminance value signal to output information indicative of the extended middle luminance toward the adder 510 and latch section 564.

The extended middle luminance will now be explained.

Figure 8:
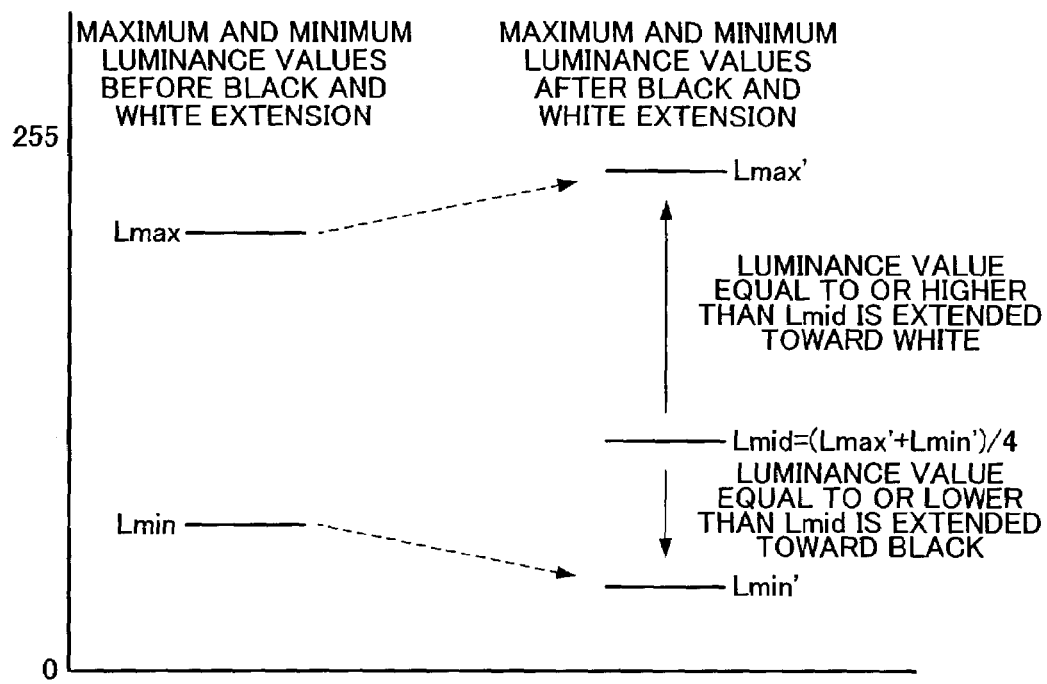
FIG. 8 is a diagrammatic view illustrating the change of the maximum and minimum luminance values Lmax, Lmin according to the one example of the embodiment of the present invention.

FIG. 8 is a diagrammatic view illustrating the change of the maximum and minimum luminance values Lmax, Lmin in accordance with the one example of the embodiment of the present invention.

In this embodiment, it is assumed that the image processing is carried out with 8-bit and 256 gray scales.

The maximum luminance changing section 46 and minimum luminance value changing section 48 respectively extend the maximum and minimum luminance value Lmax, Lmin before subjected to the black and white extension for each pixel in one image (frame) toward black or white. As shown in FIG. 8, the maximum luminance value Lmax' after extension is larger than the maximum luminance value Lmax before extension while the minimum luminance value Lmin' after extension is smaller than the minimum luminance value Lmin before extension.

Figure 14:
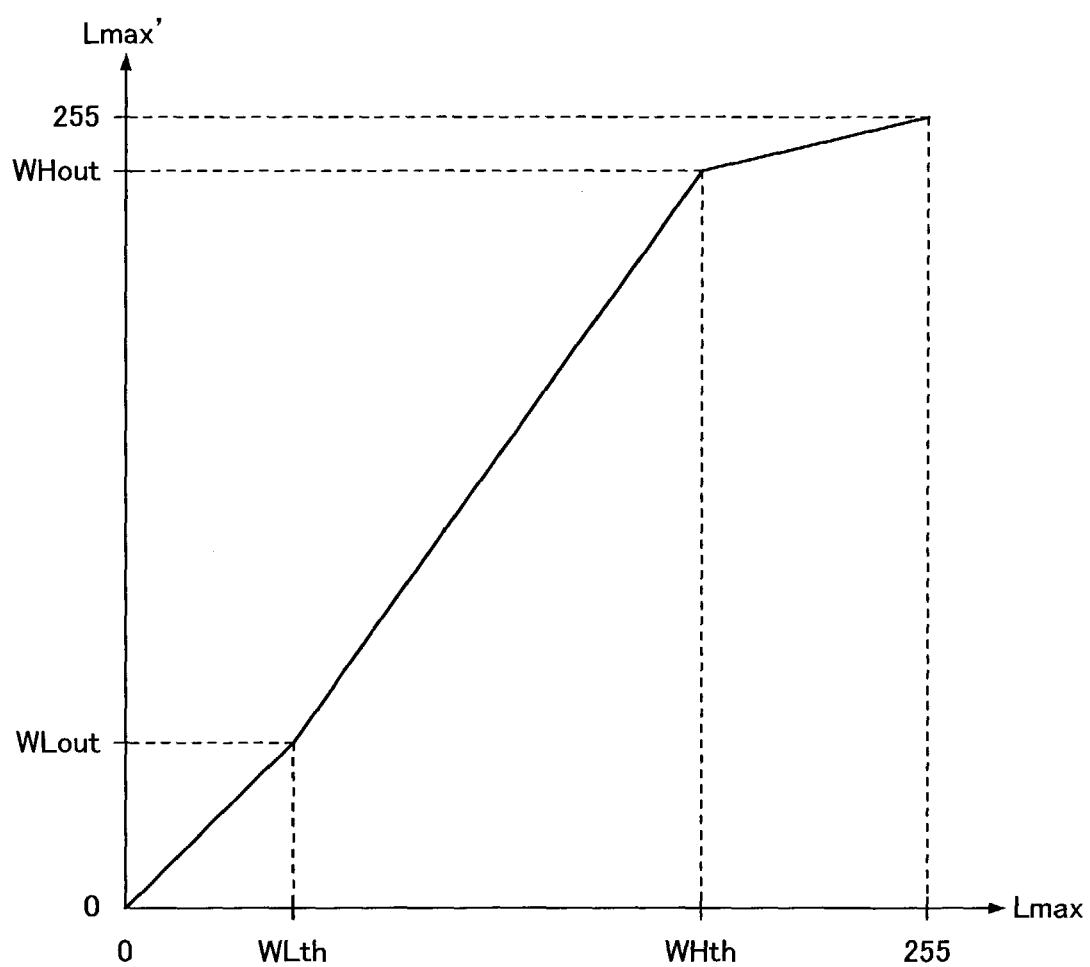
FIG. 14 is a graph illustrating the change-characteristic in a maximum luminance converting section shown in FIG. 3.

FIG. 14 is a graph illustrating the change-characteristic of the maximum luminance changing section 46 shown in FIG. 3. The horizontal axis represents the inputted maximum luminance value Lmax while the vertical axis represents the outputted maximum luminance value Lmax'. This graph shows a curved line set such that as the inputs increase, the outputs also increase between input and output values of 0 and 255. However, this curve has inflection points so that a gradient (or rate of change) will be varied at a predetermined luminance value. In this graph, the curve is set to have two inflection points (WLth, WLout) and (WHth, WHout).

In this curve, the gradient between (0, 0) and (WLth, WLout) is larger than the gradient between (WHth, WHout) and (255, 255).

Figure 15:
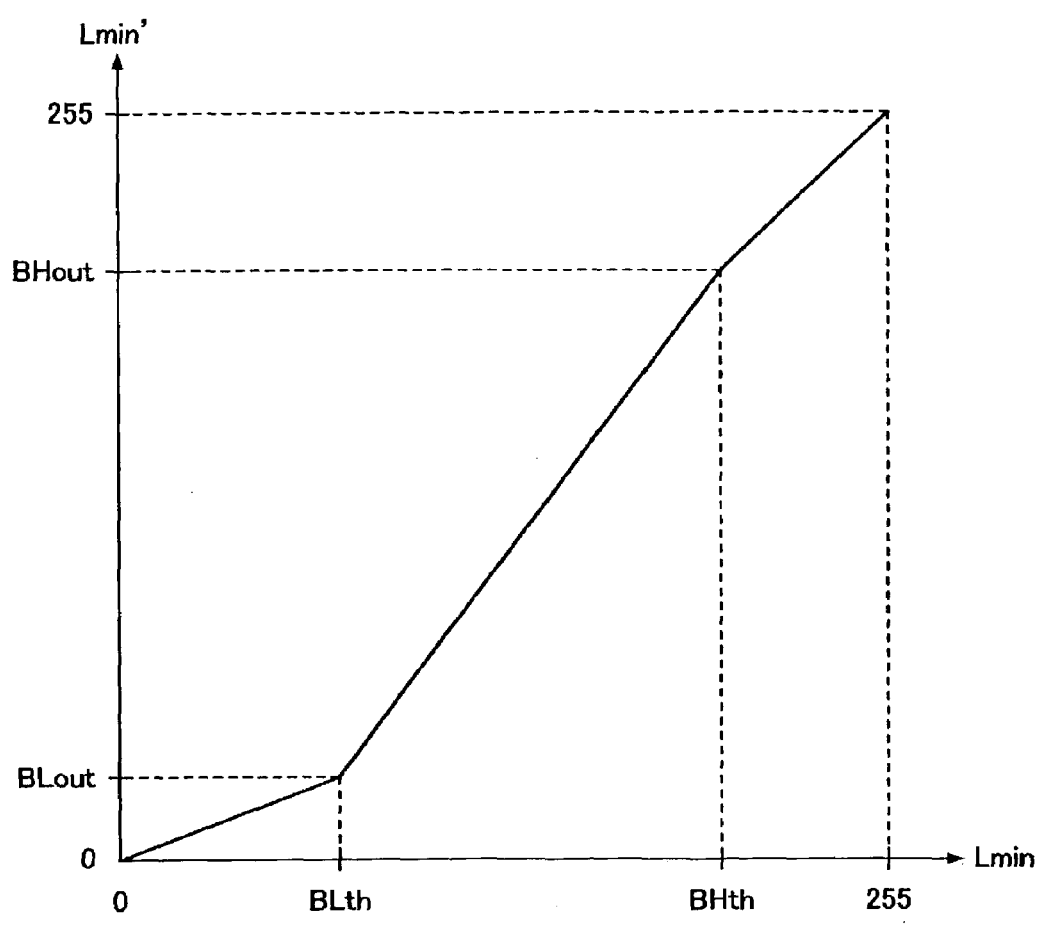
FIG. 15 is a graph illustrating the change-characteristic in a minimum luminance changing section shown in FIG. 3.

FIG. 15 is a graph illustrating the change-characteristic of the minimum luminance value changing section 48 shown in FIG. 3. The horizontal axis represents the inputted minimum luminance value Lmin while the vertical axis represents the outputted minimum luminance value Lmin'. This graph shows a curved line set such that as the inputs increase, the outputs also increase between input and output values of 0 and 255. This point is similar to the maximum luminance value change curve. This curve has inflection points (BLth, BLout) and (BHth, BHout). In this curve, the gradient between (0, 0) and (BLth, BLout) is larger than the gradient between (BHth, BHout) and (255, 255).

In such a manner, contrast can be improved to increase the quality of image by performing the extension toward white or black.

In this embodiment, the value Lmid indicative of the extended middle luminance which is the threshold value taken as a criteria for making the extension toward white or black is represented by (Lmax'+Lmin')/4. And, the black and white extension processing section 822 extends the luminance value of a pixel having its luminance larger than Lmid toward white and the other luminance value equal to or smaller than Lmid toward black.

The rate of extension Kw on the white side is (Lmax'−Lmid)/(Lmax−Lmid) while the rate of extension on the black side is (Lmid−Lmin')/(Lmid−Lmin).

The adder 510 shown in FIG. 7 determines the maximum pre-extension luminance value (Lmax) minus the extended middle luminance value (Lmid) to form a new value (Lmax−Lmid) which is in turn outputted toward the extension-rate-in-white-direction computing section 530.

The adder 512 determines the maximum post-extension luminance value (Lmax') minus the extended middle luminance value (Lmid) to form a new value (Lmax−Lmid) which is in turn outputted toward the extension-rate-in-white-direction computing section 530.

The adder 514 determines the extended middle luminance value (Lmid) minus the minimum pre-extension luminance value (Lmin) to form a new value (Lmid−Lmin) which is in turn outputted toward the extension-rate-in-black-direction computing section 532.

The adder 516 determines the extended middle luminance value (Lmid) minus the minimum post-extension luminance value (Lmin') to form a new value (Lmid−Lmin') which is in turn outputted toward the extension-rate-in-black-direction computing section 532.

The extension-rate-in-white-direction computing section 530 determines a rate of toward-white extension Kw=(Lmax'−Lmid)/(Lmax−Lmid) while the extension-rate-in-white-direction computing section 530 determines a rate of toward-black extension Kb=(Lmid−Lmin')/(Lmid−Lmin).

The latch section 560 temporarily holds information indicative of the rate of toward-white extension Kw and outputs that information toward the luminance changing section 32. Similarly, the latch section 562 temporarily holds information indicative of the rate of toward-black extension Kb and outputs that information toward the luminance changing section 32.

Each of the latch sections 560 to 564 updates its held information only when it receives the extension-rate-change-request signal from the control section 20.

The latch sections 560, 562 and 564 respectively output the rate of toward-white extension information, the rate of toward-black extension information and the extended middle luminance information toward the respective extending sections 30-1 to 30-3.

Next, the luminance changing section 32 will be explained.

Figure 9:
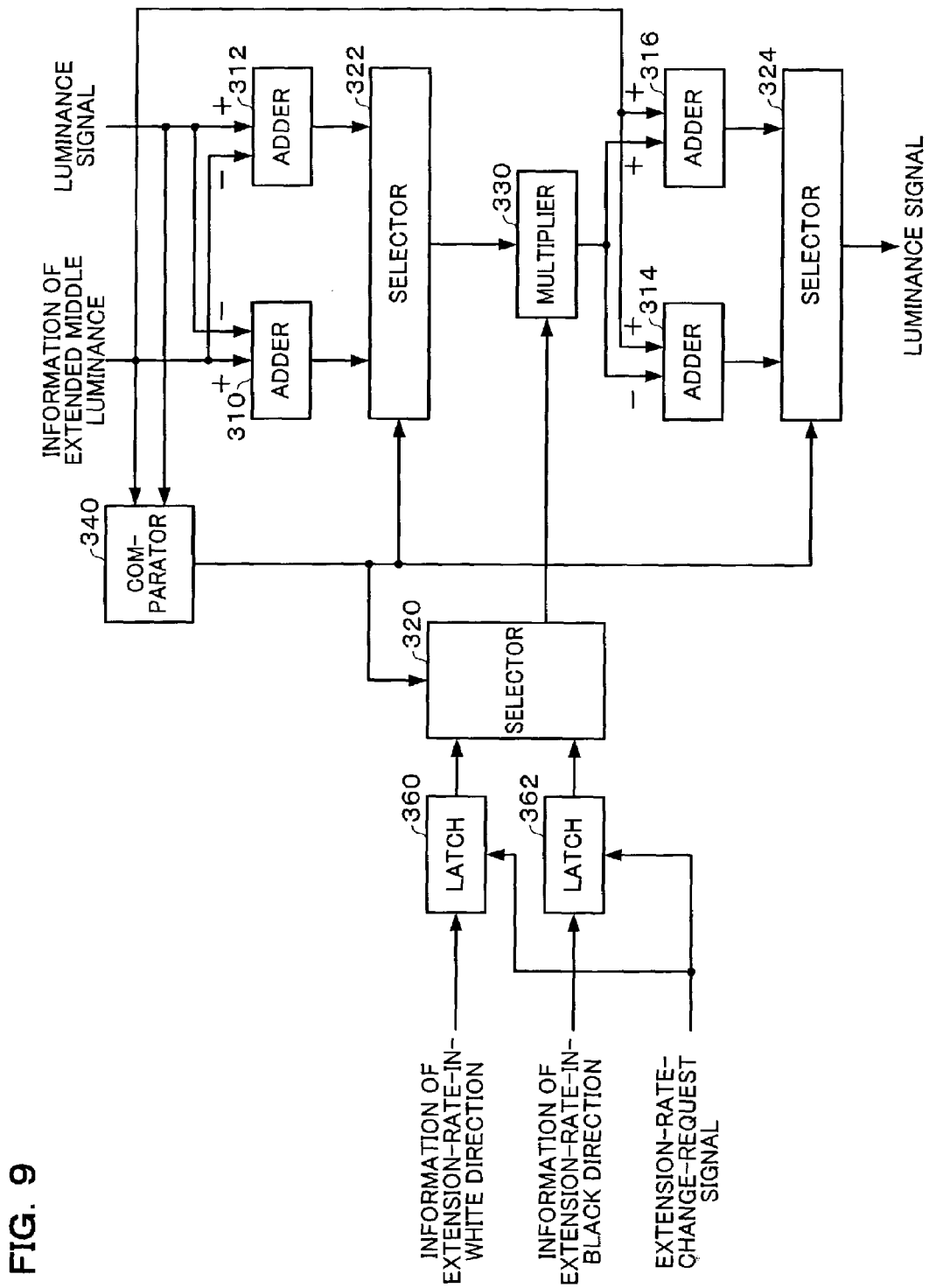
FIG. 9 is a circuit diagram of a luminance converting section according to the one example of the embodiment of the present invention.

FIG. 9 is a circuit diagram of the luminance changing section 32 according to the one example of the embodiment of the present invention.

The luminance changing section 32 comprises a latch section 360 for holding the rate of toward-white extension, a latch section 362 for holding the rate of toward-black extension, a selector circuit 320, a comparator 340, adders 310 to 316, selector circuits 322, 324 and a multiplier 330.

The comparator 340 compares the extended middle luminance information (Lmid) with a luminance signal (L). The comparator 340 outputs HIGH if Lmid is equal or larger than L and LOW if not so.

The latch section 360 receives a new rate of toward-white extension information if the extension-rate-change-request signal is HIGH and holds the original rate of toward-white extension information if not so.

The latch section 362 receives a new rate of toward-black extension information if the extension-rate-change-request signal is HIGH and holds the original rate of toward-black extension information if not so.

The selector circuit 320 acquires the rate of toward-white extension information held by the latch section 360 if a signal from comparator 340 is HIGH and takes the rate of toward-black extension information held by the latch section 362 if LOW.

The adder 310 computes Lmid−L while the adder 320 computes L−Lmid.

The selector circuit 322 outputs a value of L−Lmid from the adder 312 if the output from comparator 340 is HIGH and a value of Lmid−L from the adder 310 if not so.

The multiplier 330 multiplies the output value from the selector circuit 320 and the output value from the selector circuit 322.

The adder 314 outputs a value obtained by subtracting the output of the multiplier 330 from Lmid. The adder 316 outputs a value obtained by adding the output of the multiplier 330 to Lmid.

The selector circuit 324 outputs the value Lmid from the adder 316+the output value from the multiplier 330 if the output from the comparator 340 is HIGH, and outputs the value Lmid of the adder 314−the output value of the multiplier 330 if not so.

In such a manner, the luminance changing section 32 outputs Kw(L−Lmid)+Lmid, when L>=Lmid, and outputs L=Lmid and Lmid−Kb(Lmid−L), when L<Lmid. For convenience, these values outputted from the luminance changing section 32 will generally be referred to LOUT.

The luminance changing section 32 then outputs LOUT toward the extending sections 30-1, 30-2 and 30-3 shown in FIG. 3.

Since the extending sections 30-1, 30-2 and 30-3 shown in FIG. 3 are similar in configuration and function to one another, only the extending section 30-1 for processing R-signal will be described mainly. The extending section 30-1 outputs a signal value ROUT based on an inputted R-signal value, a luminance signal value L (or signal value outputted from the luminance computing section 10) and a post-extension luminance signal value LOUT.

More particularly, the extending section 30-1 comprises a divider and a multiplier. Among these, the divider calculates a ratio of the luminance value LOUT to the luminance signal value L, that is, LOUT/L. On the other hand, the multiplier calculates and outputs a product of this ratio with the R-signal, that is, (LOUT/L)*R. This value (LOUT/L)*R is the signal value ROUT.

Similarly, the extending sections 30-2 and 30-3 output signal values GOUT and BOUT, respectively. By the way, the luminance value formed by the signal values ROUT, GOUT and BOUT is the luminance value LOUT calculated by the luminance changing section 32 as represented by the following formula:

$$(ROUT+GOUT+BOUT)/3=(LOUT/L)(R+G+B)/3=LOUT$$

As described above, this embodiment can provide a distinct criteria on which the direction of extension toward either white or black can be determined by the black and white extension processing section 822 determining the direction of extension according to the threshold value based on the maximum and minimum luminance values.

Therefore, the black and white extension processing section 822 can improve the quality of image since the black and white extension is appropriately carried out by using such a criteria.

The black and white extension processing section 822 can further detect a change-over of scene in a picture by performing the extension of luminance value using a new rate of extension if changes of luminance values in a plurality of successive frames, that is, it the changed number of pixels belonging to the same gray scale in a plurality of successive frames exceed a predetermined level, or using the current rate of extension if the changes are less than the predetermined level.

The black and white extension processing section 822 can thus suppress the flickering of image to improve the quality of image by performing the black and white extension with the new rate of extension only when such a change-over of scene occurs.

In this embodiment, the black and white extension processing section 822 also makes the extension of luminance value when the rates of extension in luminance values close to the maximum and minimum luminance values are set at a level smaller than the rate of extension in a luminance value close to the middle luminance value.

Thus, the black and white extension processing section 822 can effectively perform the black and white extension by suppressing the extension in a region close to the maximum or minimum luminance value wherein the extension is less effectively carried out and also more extending the middle gray scale.

This is because the color will solidly be shaded when the maximum luminance value is extended in a region near black or when the minimum luminance value is extended in a region near white.

In this embodiment, furthermore, the luminance computing section 10 determines a value obtained by evenly dividing the R-, G- and B-signal values as luminance value.

In the general luminance computations, the luminance component of the G-signal would more conspicuously be extended since the extension rate of the G-signal value is larger than those of the R- and B-signals.

In this embodiment, conspicuous extensions of the luminance component of the G-signal can be prevented by applying the value obtained by evenly dividing the respective signal values as luminance value. This can improve the quality of image.

The black and white extension processing section 822 can also avoid any unbalance of color to improve the quality of image by multiplying the rate of extension thus determined and the respective R-, G- and B-signal values.

Second Example of the Embodiment

In the second example, the black and white extension is performed by applying a new rate of extension if a difference between an average value of APL (Average Picture Level) per one frame in a plurality of frames (e.g., frames n and n−1) continuative to a predetermined frame (e.g., frame n) and an average value of APL per one frame in a plurality of frames (e.g., frames n+1 and n) continuative to a frame shifted by one or more frames from the predetermine frame is equal to or higher than a predetermined level. By the way, the symbol "n" is an integer indicative of the order of frame.

To realize such a function, in the second example, the projector 4 has a configuration similar to the general configuration of FIG. 3, but is different from FIG. 3 only in the configurations of the control section 20, extension degree setting section 50, luminance changing section 32.

The functional blocks of the control section 20 will be explained below.

Figure 10:
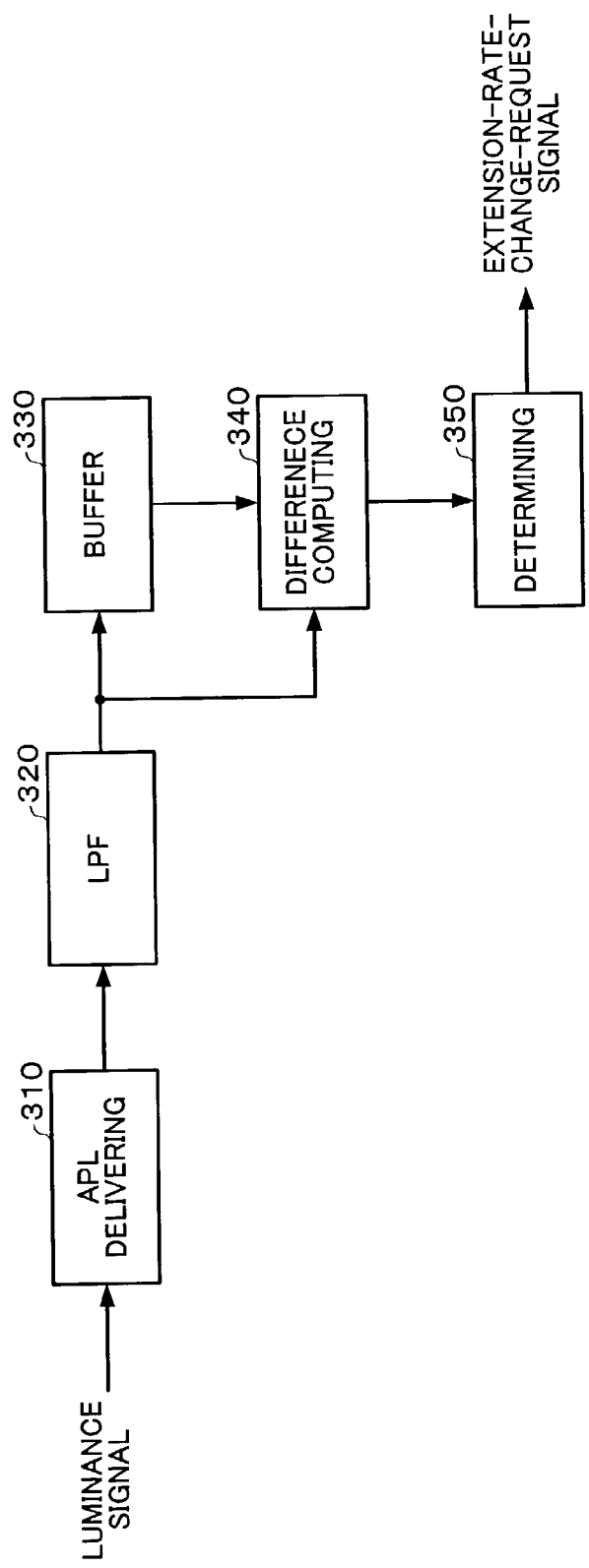
FIG. 10 is a functional block diagram of a control section according to another example of the embodiment of the present invention.

FIG. 10 is a functional block diagram of a control section 20 according to another example of the embodiment of the present invention.

The control section 20 comprises an APL delivering section 310, a low pass filter (LPF) 320, a buffer 330, a difference computing section 340 and a determining section 350.

The APL delivering section 310 operates in synchronism with the vertical synchronizing signal and delivers APL based on the luminance signal from the luminance computing section 10.

LPF 320 computes the average value of APL per one frame in a plurality of frames (e.g., five frames), based on APL from the APL delivering section 310.

The buffer 330 holds the output of LPF 320.

The difference computing section 340 computes a difference between the output of LPF 320 and the output of LPF 320 prior to one frame which is held in the buffer 330. In other words, the difference computing section 340 outputs a difference value indicative to a difference between the average of APL per one frame calculated over the n-th frame and a plurality of frames prior to the n-th frame and the average of APL per one frame calculated over the n−1-th frame and a plurality of frames prior to the n−1-th frame.

The determining section 350 outputs a extension-rate-change-request signal which is information of request for updating the rate of extend if the differential value from the difference computing section 340 is equal to or higher than a predetermined value (e.g., one of 20 to 50) toward the extension degree setting section 50, but does not output the extension-rate-change-request signal if the differential value is lower than the predetermined level.

The functional block of the extension degree setting section 50 will now be described.

Figure 11:
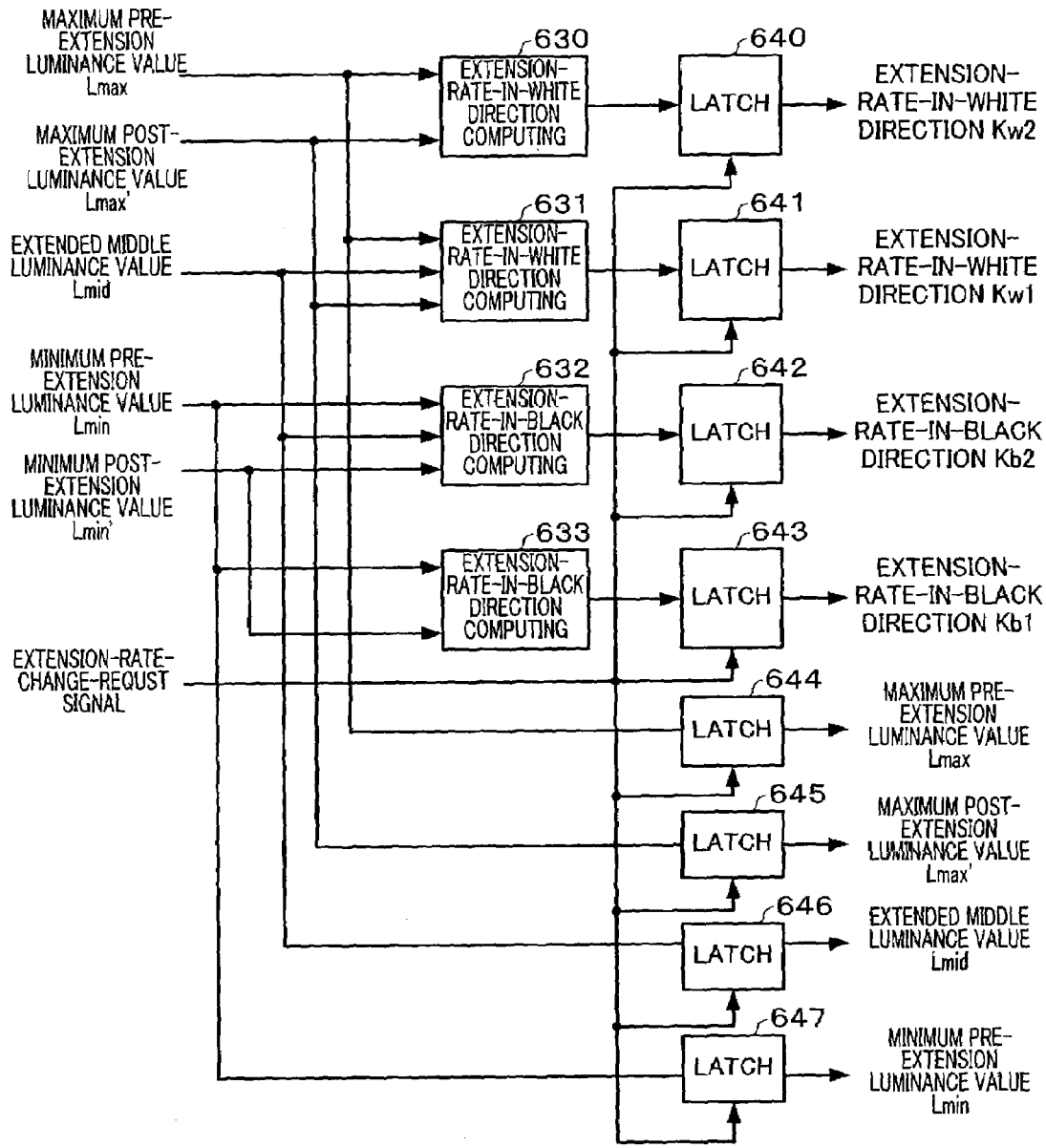
FIG. 11 is a functional block diagram of an extension degree setting section according to the other example of the embodiment of the present invention.

FIG. 11 is a functional block diagram of an extension degree setting section 50 according to the other example of the embodiment of the present invention.

The extension degree setting section 50 functions to receive the maximum pre-extension luminance value Lmax, maximum post-extension luminance value Lmax', extended middle luminance value Lmid, minimum pre-extension luminance value Lmin, minimum post-extension luminance value Lmin' and extension-rate-change-request signal and to output the rate of extension and the like.

The extension degree setting section 50 comprises extension-rate-in-white-direction computing sections 630, 631, extension-rate-in-black-direction computing sections 632, 633 and eight latch sections 640 to 647.

In this embodiment, the average value of APL per one frame through a plurality of frames from the control section 20 is used as extended middle luminance value Lmid. And, the luminance value of a pixel having its luminance value larger than Lmid will be extended toward white while the luminance value of a pixel having its luminance value equal to or smaller than the Lmid will be extended toward black.

In this embodiment, the degree of extension is set with different luminance values: (1) which are equal to or larger than zero and smaller than Lmin; (2) which are equal to or larger than Lmin and smaller than Lmid; (3) which are equal to or larger than Lmid and smaller than Lmax; and (4) which are between Lmax and 255. By the way, it is assumed herein that the luminance value is with 8-bits and 256 gray scales.

The extension-rate-in-black-direction computing section 633 computes the rate of toward-black extension $Kb1=Lmin'/Lmin$ and outputs Kb1 toward the latch section 643; the extension-rate-in-black-direction computing section 632 computes the rate of toward-black extension $Kb2=(Lmid-Lmin')/(Lmid-Lmin)$ and outputs Kb2 toward the latch section 642; the extension-rate-in-white-direction computing section 631 computes the rate of toward-white extension $Kw1=(Lmax'-Lmid)/(Lmax-Lmid)$ and outputs Kw1 toward the latch section 641; and the extension-rate-in-white-direction computing section 630 computes the rate of toward-white extension $Kw2=(255-Lmax')/(255-Lmax)$ and outputs Kw2 toward the latch section 640.

The extending section 30 applies Kb1 in the aforementioned case (1); Kb2 in the aforementioned case (2); Kw1 in the aforementioned case (3); and Kw2 in the aforementioned case (4), respectively.

The latch section 644 holds the maximum pre-extension luminance value Lmax; the latch section 645 holds the maximum post-extension luminance value Lmax'; the latch section 646 holds the extended middle luminance value Lmid; and the latch section 647 holds the minimum pre-extension luminance value Lmin.

Each of the latch sections 640 to 647 updates its held information only when it receives the extension-rate-change-request signal from the control section 20. In other words, the threshold value which is a criterion used to determine whether the rate of extension should be extended toward either of white or black is changed only on change-over of scene. Thus, flickering of image due to the black and white extension can be reduced.

In such a manner, the extension degree setting section 50 outputs the rate of extension and the like toward the luminance changing section 32.

Next, the circuitry of the luminance changing section 32 will be described.

Figure 12:
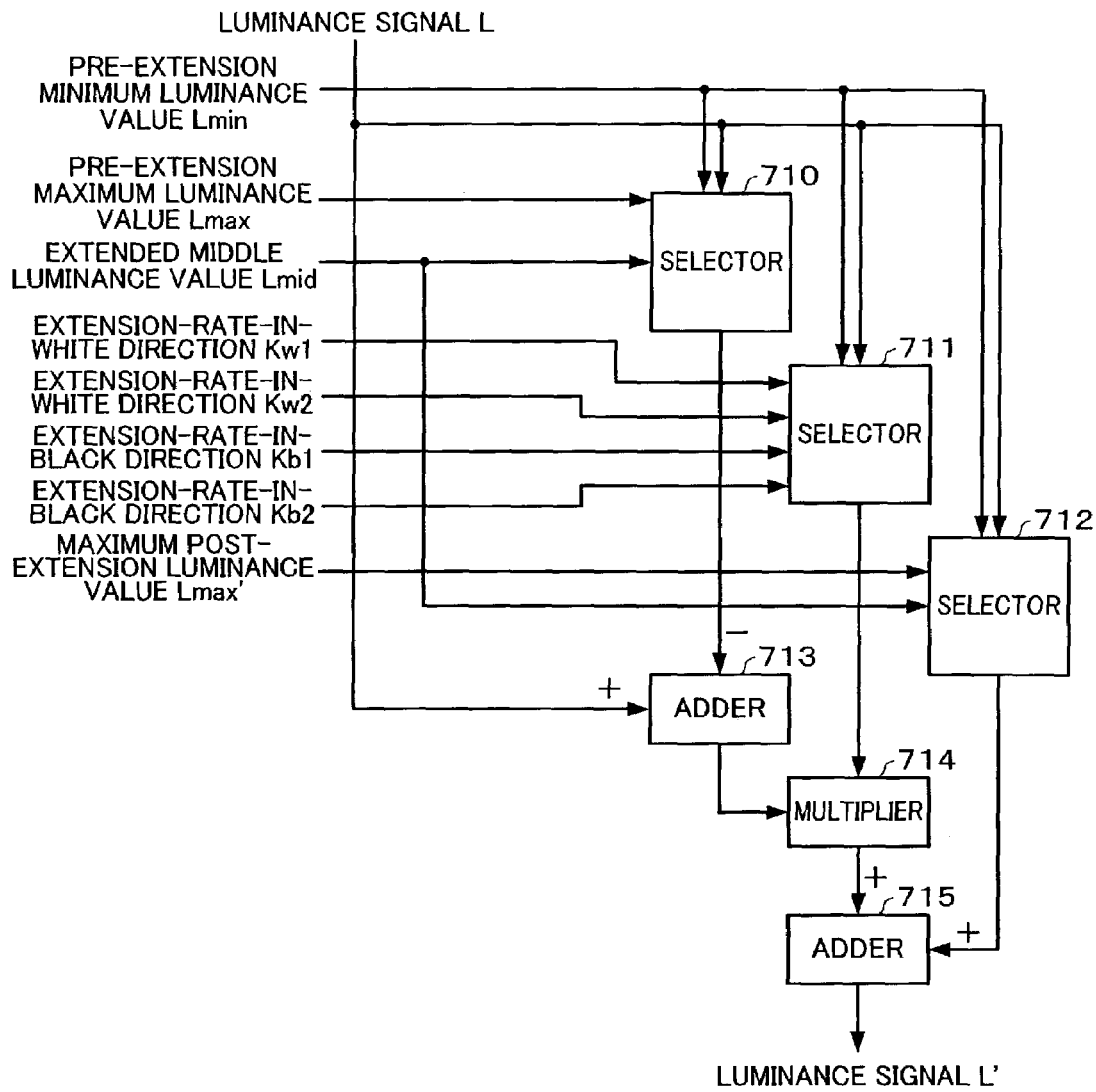
FIG. 12 is a circuit diagram of a luminance converting section according to the other example of the embodiment of the present invention.

FIG. 12 is a circuit diagram of a luminance changing section 32 according to the other example of the embodiment of the present invention.

The luminance changing section 32 extends an input luminance value (or luminance signal) L based on the rates of toward-white extension Kw1, Kw2 and the rates of toward-black extension Kb1, Kb2.

The luminance changing section 32 comprises three selector circuits 710 to 712, two adders 713, 715 and a multiplier 714.

The selector circuit 710 outputs zero if the input luminance value L is equal to or larger than zero and smaller than the minimum pre-extension luminance value Lmin; outputs Lmid if the input luminance value L is larger than the minimum pre-extension luminance value Lmin and smaller than the extended middle luminance value Lmid; and outputs Lmax if the input luminance value L is between the extended middle luminance value Lmid and 255.

The selector circuit 711 functions to output Kb1 if the input luminance value L is equal to or larger than zero and smaller than the minimum pre-extension luminance value Lmin; to output Kb2 if the input luminance value L is equal to or larger than the minimum pre-extension luminance value Lmin and smaller than the extended middle luminance value Lmid; to output Kw1 if the input luminance value L is equal to or larger than the extended middle luminance value Lmid and smaller than the maximum pre-extension luminance value Lmax; and to output Kw2 if the input luminance value L is between the maximum pre-extension luminance value Lmax and 255.

The selector circuit 712 also functions to output zero if the input luminance value L is equal to or larger than zero and smaller than the minimum pre-extension luminance value Lmin; to output Lmid if the input luminance value L is between the minimum pre-extension luminance value Lmin and the maximum pre-extension luminance value Lmax; to output Lmax' if the input luminance value L is larger than the maximum pre-extension luminance value Lmax and equal to or smaller than 255.

The adder 713 outputs a value obtained by subtracting the output of the selector circuit from the input luminance value L. The multiplier 714 outputs a value obtained by multiplying the output value of the adder 713 and a value indicative of the rate of extension from the selector circuit 711. Furthermore, the adder 715 outputs a value obtained by adding the output value of the multiplier 714 to the output value from the selector circuit 712 as output luminance value (or luminance signal) L'.

As a result, as described in connection with the above items (1) to (4), the adder 715 functions to output Kb1*L if the input luminance value L is equal to or larger than zero and smaller than Lmin; to output Kb2*(L−Lmid)+Lmid if the input luminance value L is equal to or larger than Lmin and smaller than Lmid; to output Kw1*(L−Lmid)+Lmid if the input luminance value L is equal to or larger than Lmin and smaller than Lmax; and to output Kw2*(L−Lmax)+Lmax' if the input luminance value L is between Lmax and 255.

Figure 13A:
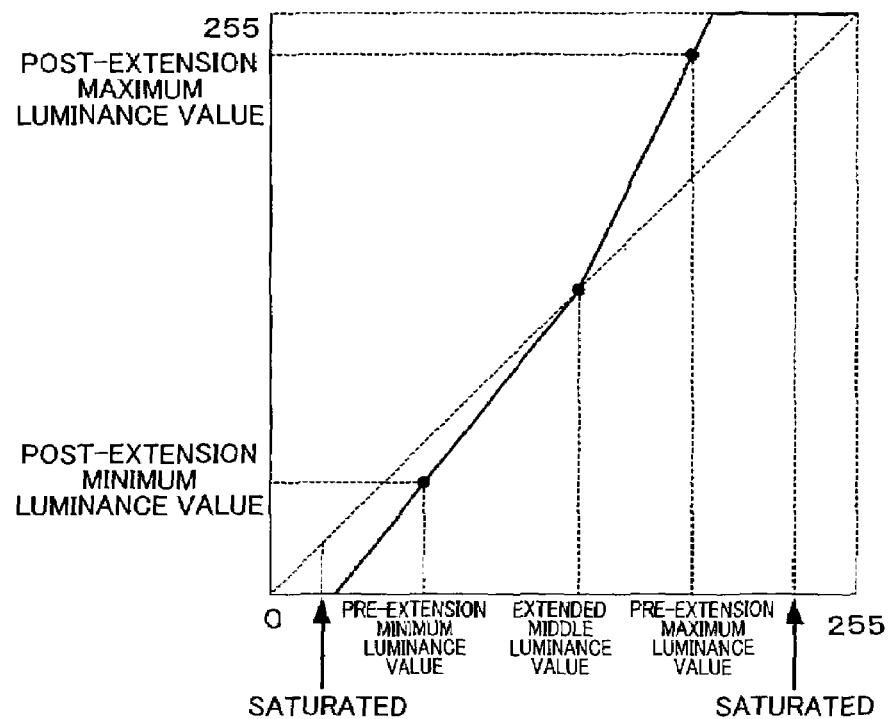
Figure 13B:
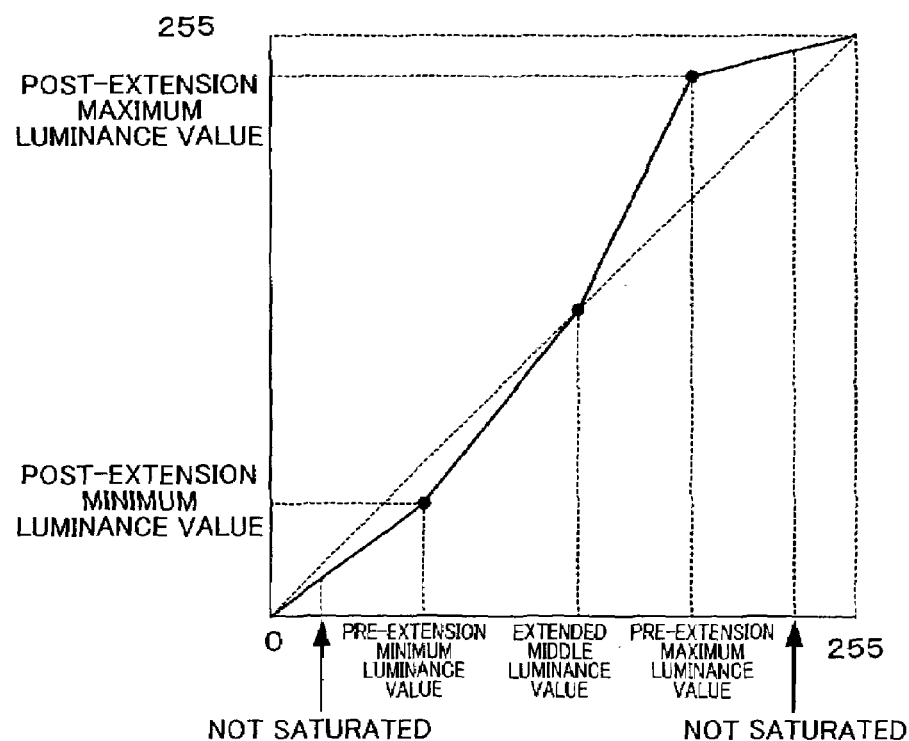
FIG. 13(B) is a diagrammatic view illustrating a luminance value-change-characteristic line in a second example of the embodiment.

FIG. 13(A) is a diagrammatic view illustrating the luminance value-change-characteristic line in a first example of the embodiment; and FIG. 13(B) is a diagrammatic view illustrating the luminance value-change-characteristic line in a second example of the embodiment. The luminance value-change-characteristic line shown herein represents the relationship between the pre- and post-extension luminance values.

For example, the technique of the first example does not consider zero which is the minimum luminance value and 255 which is the maximum luminance value. Moreover, the rate of extension will not vary until it receives an extension change request. As shown in FIG. 13(A), the luminance value-change-characteristic line in the first example of the embodiment cannot take the origin (0, 0) and the maximum coordinates (255, 255).

For such a reason, a pixel saturated on the side of white or black may be produced as shown in FIG. 13(A), if a luminance value smaller than the minimum pre-extension luminance value or larger than the maximum pre-extension luminance value is inputted in a frame other than the frames used to compute the rate of extension.

On the contrary, the luminance value-change-characteristic line in the second example can take the origin (0, 0) and the maximum coordinates (255, 255) as shown in FIG. 13(B), because the extension is carried out for the luminance values corresponding to the aforementioned items (1) to (4) in consideration of the maximum and minimum luminance values (0 and 255).

Therefore, in the second example of the embodiment, any pixel saturated on the side of white or black will not be produced as shown in FIG. 13(B) even if a luminance value smaller than the minimum pre-extension luminance value or larger than the maximum pre-extension luminance value is inputted in a frame other than the frames used to compute the rate of extension.

As described above, according to this embodiment, the black and white extension processing section 822 detects a change-over of scene using APL and updates the degree of black and white extension and the threshold value only on the change-over of scene. Thus, the flickering in the entire image due to the black and white extension can be reduced.

According to this embodiment, the black and white extension processing section 822 can suppress any abrupt variation of luminance due to the change of APL in accordance with the difference of the average APL value per one frame through a plurality of successive frames.

According to this embodiment, furthermore, the black and white extension processing section 822 can prevent the luminance value from being saturated toward white or black as shown in FIG. 13(B) by performing the extension such that the luminance value-change-characteristic line passes the origin (0, 0) and the maximum coordinates (255, 255).

Modified Examples

Although the preferred embodiment of the present invention has been described, the present invention is not limited to the aforementioned embodiments.

For example, the aforementioned circuits may be distributed in a plurality of devices for black and white extension.

Although the luminance changing section 32 is shown to separate from the extending section 30-1 to 30-3 in FIG. 3, each of the extending section 30-1 to 30-3 may have a function equal to that of the luminance changing section 32.

Although the second example of the embodiment has been described to use the average values of APL per one frame through a plurality of frames, the aforementioned black and white extension may be carried out based on a difference of APL between the respective single frames.

Although the aforementioned embodiments have been described to use the value obtained from the sum of R-, G- and B-signal values divided by three, the sum of the general values obtained from 0.30*R-signal, 0.59*G-signal and 0.11*B-signal may be used or the other values modified from these coefficients may be used.

Additionally, the image processing system executing the aforementioned black and white extension is not limited to a liquid crystal projector such as projector 4, but may be mounted in a projector using DMD (Digital Micromirror Device) or any one of various other display devices such as CRT (Cathode Ray Tube), PDP (Plasma Display Panel), FED (Field Emission Display), EL (Electro Luminescence), a direct viewing type liquid crystal display unit. By the way, DMD is a trademark of Texas Instruments Incorporated.

What is claimed is:

1. An image processing system comprising:
   an extension degree setting section which sets a degree of extension of luminance values of pixels in one frame based on the maximum and minimum luminance values of the pixels;
   an extension section which extends luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and
   a control section which generates information of request for causing the extension degree setting section to update the degree of extension, based on the maximum and minimum luminance values of the pixels in one frame,
   wherein the extension degree setting section uses a new degree of extension in the case where the information of request has been received, and uses the original degree of extension in the case where the information of request has not been received.

2. The image processing system as defined in claim 1,
   wherein the control section grasps changes of the luminance values in a plurality of successive frames and transmits the information of request to the extension degree setting section when the changes are equal to or larger than a predetermined value.

3. The image processing system as defined in claim 2,
   wherein the extension degree setting section sets a rate of extension of luminance values close to the maximum and minimum luminance values at a value smaller than a rate of extension of luminance values close to the middle luminance value.

4. The image processing system as defined in claim 3,
   wherein video signals include R-signals, G-signals and B-signals, and
   wherein the extension degree setting section uses values obtained by dividing the sum of signal values of the R-signals, G-signals and B-signals by three as the luminance values.

5. An image processing system comprising:
   an extension degree setting section which sets a degree of extension of luminance values of pixels in one frame based on the maximum and minimum luminance values of the pixels;
   an extension section which extends luminance values of pixels to be subjected to processing among the, pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and
   a control section which generates information of request for causing the extension degree setting section to update the degree of extension when a difference in APL between two different frames is equal to or larger than a predetermined value,
   wherein the extension degree setting section uses a new degree of extension in the case where the information of request has been received, and uses the original degree of extension in the case where the information of request has not been received.

6. An image processing system comprising:
   an extension degree setting section which sets a degree of extension of luminance values of pixels in one frame based on the maximum and minimum luminance values of the pixels;
   an extension section which extends luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and
   a control section which generates information of request for causing the extension degree setting section to update the degree of extension when a difference between an average value of APL per one frame of a plurality of frames subsequent to a predetermined frame and an average value of APL per one frame of a plurality of frames subsequent to a frame different from the predetermined frame is equal to or larger than a predetermined value,
   wherein the extension degree setting section uses a new degree of extension in the case where the information of request has been received, and uses the original degree of extension in the case where the information of request has not been received.

7. The image processing system as defined in claim 6,
   wherein the extension degree setting section sets a rate of extension of luminance values close to the maximum and minimum luminance values at a value smaller than a rate of extension of a luminance value close to the middle luminance value.

8. The image processing system as defined in claim 7,
   wherein, in a luminance value-change-characteristic line representing the relationship between the luminance values of pre-extension and post-extension, the extension section extends the luminance values so that, outside a range showing the luminance values subjected to the extension, the luminance value change characteristic line on the side of lower luminance values is a straight line connecting an origin and a bottom point of a line representing change-characteristic of the luminance values subjected to the extension, and the luminance value-change-characteristic line on the side of higher luminance values is a straight line connecting the maximum point and a top point of the line representing change-characteristic of the luminance values subjected to the extension.

9. A projector comprising:

an extension degree setting section which sets a degree of extension of luminance values of pixels in one frame based on the maximum and minimum luminance values of the pixels;

an extension section which extends luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and a control section which generates information of request for causing the extension degree setting section to update the degree of extension, based on the maximum and minimum luminance values of the pixels in one frame, wherein the extension degree setting section uses a new degree of extension in the case where the information of request has been received, and uses the original degree of extension in the case where the information of request has not been received.

10. A projector comprising:

an extension degree setting section which sets a degree of extension of luminance values of pixels in one frame based on the maximum and minimum luminance values of the pixels;

an extension section which extends luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and a control section which generates information of request for causing the extension degree setting section to update the degree of extension when a difference in APL between two different frames is equal to or larger than a predetermined value, wherein the extension degree setting section uses a new degree of extension in the case where the information of request has been received, and uses the original degree of extension in the case where the information of request has not been received.

11. A computer-readable information storage medium storing a program for causing a computer to function as:

an extension degree setting section which sets a degree of extension of luminance values of pixels in one frame based on the maximum and minimum luminance values of the pixels;

an extension section which sets luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and a control section which generates information of request for causing the extension degree setting section to update the degree of extension, based on the maximum and minimum luminance values of the pixels in one frame, wherein the extension degree setting section uses a new degree of extension in the case where the information of request has been received, and uses the original degree of extension in the case where the information of request has not been received.

12. The information storage medium as defined in claim 11, wherein the control section grasps changes of the luminance values in a plurality of successive frames and transmits the information of request to the extension degree setting section when the changes are equal to or larger than a predetermined value.

13. The information storage medium as defined in claim 12, wherein the extension degree setting section sets a rate of extension of luminance values close to the maximum and minimum luminance values at a value smaller than a rate of extension of a luminance value close to the middle luminance value.

14. The information storage medium as defined in claim 13, wherein video signals include R-signals, G-signals and B-signals, and wherein the extension degree setting section uses values obtained by dividing the sum of signal values of the R-signals, G-signals and B-signals by three as the luminance values.

15. A computer-readable information storage medium storing a program for causing a computer to function as:

an extension degree setting section which sets a degree of extension of luminance values of pixels in one frame based on the maximum and minimum luminance values of the pixels;

an extension section which sets luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and a control section which generates information of request for causing the extension degree setting section to update the degree of extension when a difference in APL between two different frames is equal to or larger than a predetermined value, wherein the extension degree setting section uses a new degree of extension in the case where the information of request has been received, and uses the original degree of extension in the case where the information of request has not been received.

16. A computer-readable information storage medium storing a program for causing a computer to function as:

an extension degree setting section which sets a degree of extension of luminance values of pixels in one frame based on the maximum and minimum luminance values of the pixels;

an extension section which sets luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value; and a control section which generates information of request for causing the extension degree setting section to update the degree of extension when a difference between an average value of APL per one frame of a plurality of frames subsequent to a predetermined frame and an average value of APL per one frame of a plurality of frames subsequent to a frame different from the predetermined frame is equal to or larger than a predetermined value, wherein the extension degree setting section uses a new degree of extension in the case where the information of request has been received, and uses the original degree of extension in the case where the information of request has not been received.

17. The information storage medium as defined in claim 16, wherein the extension degree setting section sets a rate of extension of luminance values close to the maximum and minimum luminance values at a value smaller than a rate of extension of a luminance value close to the middle luminance value.

18. The information storage medium as defined in claim 17, wherein, in a luminance value-change-characteristic line representing the relationship between the luminance values of pre-extension and post-extension, the extension section extends the luminance values so that, outside a range showing the luminance values subjected to the extension, the luminance value-change-characteristic line on the side of lower luminance values is a straight line connecting an origin and a bottom point of a line representing change-characteristic of the luminance values subjected to the extension, and the luminance value-change-characteristic line on the side of higher luminance values is a straight line connecting the maximum point and a top point of the line representing change-characteristic of the luminance values subjected to the extension.

19. A black and white extension processing method of performing a black and white extension of luminance values of video signals, comprising:

computing the luminance values of inputted video signals;

grasping the maximum and minimum values among the luminance values in one frame;

computing a predetermined threshold value, based on the grasped maximum and minimum luminance values; and extending luminance values equal to or higher than the threshold value toward one of black and white sides and extending luminance values lower than the threshold value toward one of white and black sides, wherein, when performing the extension, the luminance values are extended by using a new rate of extension in the case where the changes of the luminance values in a plurality of successive frames are equal to or larger than a predetermined value and using the current rate of extension in the case where the changes are smaller than the predetermined value.

20. The method as defined in claim 19, wherein, when performing the extension of the luminance values, a rate of extension of luminance values close to the maximum and minimum luminance values is set at a value smaller than a rate of extension of luminance values close to the middle luminance value.

21. The method as defined in claim 20, wherein the video signals include R-signals, G-signals and B-signals, and wherein the luminance values are obtained by dividing the sum of signal values of the R-signals, G-signals and B-signals by three.

22. A black and white extension processing method of performing a black and white extension of luminance values of video signals, comprising:

computing the luminance values of inputted video signals;

grasping the maximum and minimum values among the luminance values in one frame;

computing a predetermined threshold value, based on the grasped maximum and minimum luminance values; and extending luminance values equal to or higher than the threshold value toward one of black and white sides and extending luminance values lower than the threshold value toward one of white and black sides, wherein the extension of the luminance values is performed using a new rate of extension when a difference of APL between two different frames is equal to or larger than a predetermined value and using the current rate of extension when the difference is smaller than the predetermined value.

23. A black and white extension processing method of performing a black and white extension of luminance values of video signals, comprising:

computing the luminance values of inputted video signals;

grasping the maximum and minimum values among the luminance values in one frame;

computing a predetermined threshold value, based on the grasped maximum and minimum luminance values; and extending luminance values equal to or higher than the threshold value toward one of black and white sides and extending luminance values lower than the threshold value toward one of white and black sides, wherein the extension of the luminance values is performed using a new rate of extension when a difference between an average value of APL per one frame of a plurality of frames subsequent to a predetermined frame and an average value of APL per one frame of a plurality of frames subsequent to a frame different from the predetermined frame is equal to or larger than a predetermined value, and using the current rate of extension when the difference is smaller than the predetermined value.

24. The method as defined in claim 23, wherein a rate of extension of luminance values close to the maximum and minimum luminance values is set at a value smaller than a rate of extension of luminance values close to the middle luminance value.

25. The method as defined in claim 24, wherein, in a luminance value-change-characteristic line representing the relationship between the luminance values of pre-extension and post-extension, the extension of the luminance values is performed so that, outside a range showing the luminance values subjected to the extension, the luminance value-change-characteristic line on the side of lower luminance values is a straight line connecting an origin and a bottom point of a line representing change-characteristic of the luminance values subjected to the extension, and the luminance value-change-characteristic line on the side of higher luminance values is a straight line connecting the maximum point and a top point of the line representing change-characteristic of the luminance values subjected to the extension.

26. A projector comprising:

an extension degree setting section which sets a degree of extension of luminance values of pixels in one frame based on the maximum and minimum luminance values of the pixels;

an extension section which extends luminance values of pixels to be subjected to processing among the pixels in the frame toward one of black and white sides based on the degree of extension when the luminance values are equal to or higher than a predetermined threshold value, and extends the luminance values toward one of white and black sides based on the degree of extension when the luminance values are lower than the predetermined threshold value;

a control section which generates information of request for causing the extension degree setting section to update the degree of extension when a difference between an average value of APL per one frame of a plurality of frames subsequent to a predetermined frame and an average value of APL per one frame of a plurality of frames subsequent to a frame different from the predetermined frame is equal to or larger than a predetermined value, wherein the extension degree setting section uses a new degree of extension in the case where the information of request has been received, and uses the original degree of extension in the case where the information of request has not been received.

* * * * *